(12) United States Patent  
Siessegger

(10) Patent No.: US 9,374,855 B2
(45) Date of Patent: Jun. 21, 2016

(54) POWER LINE COMMUNICATION FOR LIGHTING SYSTEMS

(71) Applicant: Bernhard Siessegger, Danvers, MA (US)

(72) Inventor: Bernhard Siessegger, Danvers, MA (US)

(73) Assignee: OSRAM SYLVANIA INC., Wilmington, MA (US)

( * ) Notice: Subject to any disclaimer, the term of this patent is extended or adjusted under 35 U.S.C. 154(b) by 72 days.

(21) Appl. No.: 14/062,425

(22) Filed: Oct. 24, 2013

(65) Prior Publication Data

US 2015/0115809 A1 Apr. 30, 2015

(51) Int. Cl.
*H05B 41/28* (2006.01)
*H05B 33/08* (2006.01)
*H04B 3/54* (2006.01)
*H05B 37/02* (2006.01)

(52) U.S. Cl.
CPC ............ *H05B 33/0803* (2013.01); *H04B 3/548* (2013.01); *H05B 33/0818* (2013.01); *H05B 37/0263* (2013.01); *H04B 2203/5416* (2013.01); *H05B 33/0815* (2013.01); *H05B 33/0851* (2013.01)

(58) Field of Classification Search
USPC ............ 315/247, 224, 225, 209 R, 274–289, 315/291, 307–326
See application file for complete search history.

(56) References Cited

U.S. PATENT DOCUMENTS

| | | | | |
|---|---|---|---|---|
| 7,919,936 B2 * | 4/2011 | Liu et al. | | 315/307 |
| 7,928,670 B2 * | 4/2011 | Chen et al. | | 315/308 |
| 8,044,609 B2 * | 10/2011 | Liu | | 315/291 |
| 8,410,716 B2 * | 4/2013 | Yao et al. | | 315/291 |
| 8,525,438 B1 * | 9/2013 | Cheung et al. | | 315/291 |
| 8,624,512 B2 * | 1/2014 | Li | | 315/192 |
| 8,773,027 B2 * | 7/2014 | Pan | | 315/201 |
| 2008/0231198 A1 | 9/2008 | Zarr | | |
| 2011/0248835 A1 | 10/2011 | Speegle | | |
| 2012/0032613 A1 * | 2/2012 | Liu et al. | | 315/297 |

FOREIGN PATENT DOCUMENTS

EP 1555859 A1 7/2005
WO 2008079399 A2 7/2008

OTHER PUBLICATIONS

Patent Abstract of EP Publication No. 1555859, Publication Date: Jul. 20, 2005 downloaded from espacenet.com (1 page).

(Continued)

*Primary Examiner* — Tuyet Vo
(74) *Attorney, Agent, or Firm* — Andrew Martin

(57) ABSTRACT

Techniques are provided for bi-directional communication between a power supply and one or more light engines (and/or other lighting system components) via the existing power lines so that no additional communication wires are needed. In particular, the power supply can transmit information by modulating its output (voltage or current) and the light engine (or other lighting componentry, such as a sensor) can communicate back by modulating how much power it draws from the power supply. Any suitable type of modulation scheme can be used, and a master-slave arrangement can be used to control the bi-directional communication if so desired, so as to avoid multiple devices communicating over the power line communication channel at the same time. Other embodiments allow a multiple simultaneous communications over the power line communication channel.

19 Claims, 20 Drawing Sheets

(56) References Cited

OTHER PUBLICATIONS

Maslin, Emily, International Search Report and Written Opinion of the International Searching Authority for counterpart application PCT/US2014/061383, dated May 19, 2015, European Patent Office, Rijswijk, The Netherlands (13 pages).

* cited by examiner

POWER LINE COMMUNICATION FOR LIGHTING SYSTEMS

RELATED APPLICATION

This application is related to U.S. application Ser. No. 14/062,496 filed Oct. 24, 2013 and titled "Power Line Communication for Lighting Systems" which is herein incorporated by reference in its entirety.

FIELD OF THE DISCLOSURE

The present application relates to lighting systems, and more specifically to bi-directional communication between power supplies, sometimes referred to as drivers, and lighting componentry without additional control wires.

BACKGROUND

Light emitting diodes (LEDs) and driving circuits can be electrically connected to provide a given lighting system. A typical driving circuit is configured with a switch-mode power supply topology, and may include a filtering capacitor in parallel to the LED string being powered. Depending on the input power source, a bridge rectifier may also be included in the topology. Optionally, a linear resistance controller in series to the LED string may be added as well. A single LED but more often multiple LEDs arranged in series and/or parallel or any combinations thereof are referred to as an LED array. A LED light engine may just be an LED array, but more often mechanical housing and optics as well as electrical connectors make up the light engine. In addition a light engine often comprises some of the above mentioned driving circuit, e.g. the linear resistance controller. The remainder of the LED driving circuitry is then often referred to as the LED driver or LED power supply. Very often the LED driver is contained in a separate housing spatially apart from the light engines and combinations of connectors and wiring making up the respective harnesses is used to create the required electrical connections. One driver may supply a multitude of light engines. Communications between a given driver and an LED light engine can be carried out using dedicated communication links for each direction.

DETAILED DESCRIPTION

Figure 1A:
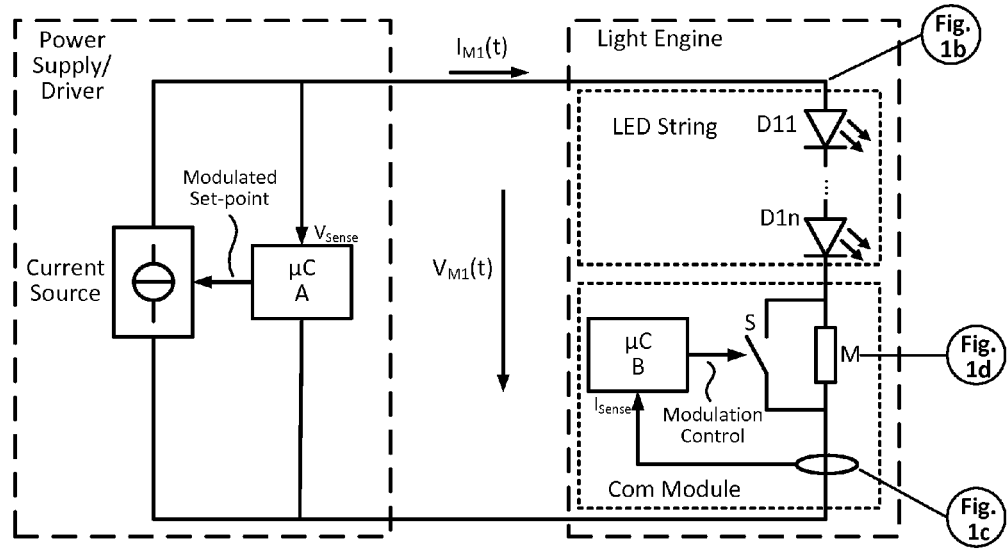
FIGS. 1a and 1a' each schematically illustrates a lighting system configured for bi-directional power line communication in accordance with an embodiment of the present invention.

Techniques are provided for bi-directional communication between a power supply and one or more light engines (and/or other lighting system components such as sensors) via the existing power lines so that no additional communication wires are needed. In particular, the power supply can transmit information by modulating its output (voltage or current) and the light engine (or other load or lighting componentry, such as a sensor) can communicate back by modulating how much power it draws from the power supply. Any suitable type of modulation scheme can be used to facilitate bi-directional communication, wherein current is modulated for one direction of communication and voltage is modulated for the other direction of communication. Example modulation schemes include the use of a switchable element and/or an adjustable voltage or current source, wherein the switchable element and/or adjustable voltage/current source is responsive to a modulation control signal. A master-slave arrangement can be used to control the bi-directional communication, in some cases. Other embodiments allow a multiple simultaneous communications over the power line communication channel.

GENERAL OVERVIEW

As previously explained, communications between a light engine and the respective power supply or driver can be carried out using dedicated communication links. There are a multitude of reasons for having communication between a light engine and the driver. For example, the communication link may be used in communicating various parameter settings from the driver to the light engine, such as a brightness and color settings. The dedicated communication channel is generally implemented with additional control wires and is typically not bi-directional, wherein communications are provided in a one-way fashion from the driver to the light engine. In some cases, the light engine may utilize various sensor outputs (e.g., occupied color sensor for measuring the spectral makeup of the generated light), which can be communicated from the light engine to the driver. In such cases, the sensors are powered over a pair of wires and communicate sensor data back to the driver through one or more additional wires. While using dedicated communication channels is suitable way of implementing communication between a driver and light engine, the additional wires necessitate use of connectors that accommodate the extra wires and tend to increase the cost/complexity of retrofit operations.

Thus, and in accordance with an embodiment of the present invention, techniques are provided for bi-directional communication between a power supply and one or more light engines (and/or other lighting system components such as occupancy sensor) via the existing power lines so that no additional control wires are needed. In particular, the power supply can transmit information by modulating its output (voltage or current) and the load can communicate back by modulating how much power is takes from the power supply. To this end, note that even though the power supply sets either voltage or current, the other variable (current or voltage, as the case may be) is determined by the load (e.g., light engine, sensor, or other lighting system component, as will be appreciated in light of this disclosure). The techniques allow for a simultaneous bi-directional communication in both directions sometimes also referred to as full-duplex mode of communication.

Figure 11A:
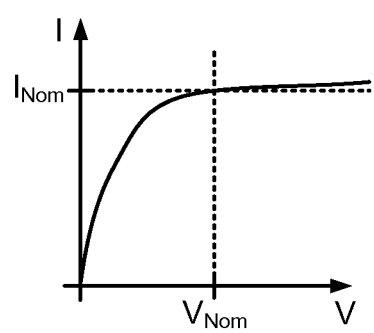
FIG. 11*a* illustrates the voltage-current characteristic of a constant current source (or constant current sink).
Figure 11B:
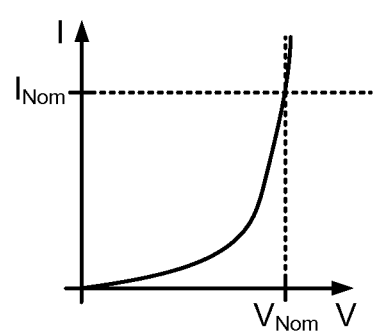
FIG. 11*b* illustrates the voltage-current characteristic of a constant voltage source (or constant voltage sink).

For example, with a constant current LED driver, the driver modulates its output current to send a message to the light engine, and measures its own output voltage to receive a message from the light engine. In a corresponding fashion, the light engine modulates its forward voltage drop to send a message to the driver, and measures the modulated current from the driver to receive a message from the driver. A constant current LED driver has voltage-current characteristic at its output that is similar to that of FIG. 11*a*. It is advantageous in case in that, with a constant current driver, the light engine (e.g., a single LED or LED string) has a voltage source characteristic (sometimes also referred to as voltage sink characteristic) similar to the voltage-current characteristic shown in FIG. 11*b*. A source or sink can be classified to have a current source characteristic if $$\left. \frac{dI}{dV} \right|_{V_{Nom}} \leq \frac{I_{Nom}}{V_{Nom}}$$

the voltage derivative of current at nominal voltage is less or equal to the quotient of nominal current to nominal voltage). A source or sink can be classified to have a voltage source characteristic if $$\left. \frac{dI}{dV} \right|_{V_{Nom}} \geq \frac{I_{Nom}}{V_{Nom}}.$$

The nominal voltage $V_{Nom}$ and nominal current $I_{Nom}$ is the magnitude of the voltage and current at nominal operation. As will be further appreciated in light of this disclosure, the driver still effectively operates as a constant current driver despite the fact that there a small modulation of the driver output current used to transmit data from the driver to the light engine (this modulation is generally imperceptible or otherwise transparent to the user). The light engine will communicate back to the driver by modulating its voltage, and if there is no communication only the forward drop of the LEDs is seen by the driver. In one such embodiment, the driver is configured to modulate the set-point of its constant current source to send messages to the light engine, and the light engine can modulate the voltage drop seen by the driver by switching a series connected modulation element in and out so as to artificially increase and decrease the voltage seen across the LEDs of a given string. In other embodiments, the light engine can be configured to modulate the set-point of a voltage source to send messages to the driver. In such example cases, the voltage source is generally referred to herein as a modulation element.

With a constant voltage LED driver, the driver modulates its output voltage to send a message to the light engine, and measures delivered current to receive a message from the light engine. In a corresponding fashion, the light engine modulates current it is consuming to send a message to the driver, and measures voltage from the driver to receive a message from the driver. As will be appreciated, the driver still effectively operates as a constant voltage driver despite the fact that there a small modulation of the driver output voltage used to transmit data from the driver to the light engine (just as with a small modulation of output current, this voltage modulation is generally imperceptible or otherwise transparent to the user). The light engine will communicate back to the driver by modulating its current, and if there is no communication only an unmodulated current is seen by the driver. In one such embodiment, the driver is configured to modulate the set-point of its constant voltage source to send messages to the light engine, and the light engine can modulate the current seen by the driver by switching a parallel connected modulation element in and out so as to artificially increase and decrease the current through the LEDs of a given string. In other embodiments, the light engine can be configured to modulate the set-point of a parallel connected current source to send messages to the driver. In such example cases, the parallel connected current source is generally referred to herein as a modulation element.

As will be further appreciated in light of this disclosure, the techniques can be used for bi-directional communication between other elements of a given lighting system as well, and is not limited to communications between drivers and light engines. For example, a driver can communicate with sensors deployed within a given light engine or otherwise in the area to be lit. Likewise, a driver can communicate with other drivers, a room controller, or an overall light management system (LMS). Such communications allow for, for instance, sharing the information provided by a sensor with the entire lighting system. In addition, such an embodiment allows more complex and enhanced lighting controls as well as the integration of lighting in an overall building automation system.

In some embodiments, a master-slave communication protocol is used to prevent multiple communications from occurring at any one time. However, other embodiments may employ a communication protocol that accommodates simultaneous communications. To this end, the techniques can be used in conjunction with any number of communication protocols depending on factors such as desired level of simplicity (or complexity, as the case may be) with respect to decoding and interpreting messages.

Numerous variations will be apparent in light of this disclosure. For instance, in some embodiments, the techniques can also be employed for systems that include light engines connected in parallel driven by constant current driver with low-dynamic response. Low-dynamic response means that the driver behaves more like a constant voltage source rather than a current source for short time intervals. This is true for most constant current drivers, in particular the lower cost implementations as those drivers typically have an output capacitor of substantial size in order to keep the ripple current through the LEDs low. This output capacitor prevents fast dynamic changes. In addition, and in accordance with some embodiments, the driver may be configured to vary the modulation scheme based on the given dimming mode. So, for example, the driver can be configured to change the modulation scheme as the driver switches from analog dimming to pulse width modulated (PWM) dimming, and the light engine can be configured to detect the given dimming mode and to use a corresponding decoding process for the given modulated signal.

The techniques disclosed herein can be used to reduce efforts in wiring (e.g., labor, wires, and connectors), and may also reduce the risk of wrong wiring (since additional wiring is not needed). Likewise, note that the techniques can be readily deployed without interfering with legacy components that are not capable of receiving or sending communications as described herein, and the driver will still deliver the rated voltage/current with or without communications (the modulation of current and voltage values can be done within a given tolerance so as to remain in compliance). Further note that the same wiring can be used for all systems (connectors, cables, etc). Therefore, a supplier doesn't have to stock wiring for both so-called smart and dumb systems, even though that supplier's customers may be requesting both types of products. Further note that the techniques can be implemented in the context of modular system, whether it be a relatively simple system (e.g., 1 driver and 1 light engine) or a complex system (e.g., several drivers, light engines, and sensors). Moreover, the techniques can leverage existing processing capability, such as microcontrollers that are deployed in existing drivers and light engines.

Circuit Architecture

FIG. 1a schematically illustrates a lighting system configured for bi-directional power line communication in accordance with an embodiment of the present invention. As can be seen in this example configuration, the system generally includes a power supply or driver and a light engine. The driver includes a constant current source and a microcontroller A (µC A), and the light engine includes an LED string (D11-D1n), a microcontroller B (µC B), a switch S, and a modulation element M. Other components typical of a driver and light engine are not shown, but will also be apparent.

In operation, the system generally uses current and voltage provided by driver for bi-directional communication, wherein the driver modulates current and measures its own output voltage and the light engine modulates voltage and measures current. To this end, each direction of communication uses its own Kirchhoff's circuit law (one direction for voltage, the other for current). In more detail, the microcontroller A of the driver is operatively coupled across the power lines via two input ports of microcontroller A so that it can sense ($V_{Sense}$) or otherwise measure the voltage drop $V_{M1}(t)$ across the light engine. As can be further seen in FIG. 1a, the microcontroller A includes an output port operatively coupled to the current source and is programmed or otherwise configured to adjust the set-point of the current source via the Modulated Set-point signal provided at that output port.

On the light engine side of the system, the microcontroller B is operatively coupled to the LED string via an input port of microcontroller B so that it can sense ($I_{Sense}$) or otherwise measure the current $I_{M1}(t)$ flowing through the LED string of the light engine. As can be further seen, the microcontroller B includes an output port operatively coupled to the switch S and is programmed or otherwise configured to open and close that switch via the Modulation Control signal provided at that output port of microcontroller B, thereby switching the modulation element M in and out of the circuit so as to cause a corresponding change in the voltage drop across the light engine. Note that the switch S can be normally turned on so that the modulation element M is normally by-passed for efficiency reasons (to reduce power dissipation), in accordance with an embodiment.

Figure 1B:
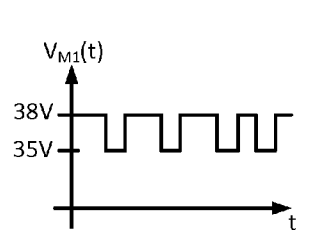
FIG. 1b-c each illustrates a power line communication signal that can be provided by the system of FIG. 1a or 1a', in accordance with an embodiment of the present invention.
Figure 1D:
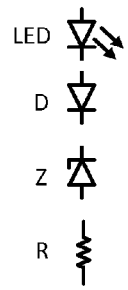
FIG. 1d illustrates example modulation elements that can be used by the system of FIG. 1a or 1a', in accordance with an embodiment of the present invention.
Figure 1C:
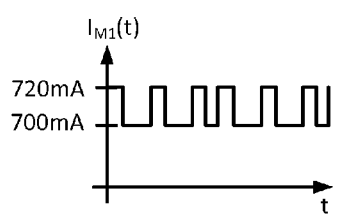

Thus, by modulating the set-point value provided to the current source of the driver, the microcontroller A can modulate the output current $I_{M1}(t)$ of the driver, so as to provide a communication signal to the light engine. One example such communication signal is shown in FIG. 1c, and is generally designated on FIG. 1a. In addition, by modulating the in-circuit presence of the modulation element M in the light engine, the microcontroller B can modulate the output voltage $V_{M1}(t)$ of the driver, so as to provide a communication signal to the driver. One example such communication signal is shown in FIG. 1b, and is generally designated on FIG. 1a.

The current source, microcontrollers A and B, LEDs D11-D1n, modulation element M, and switch S can be implemented, for example, with discrete conventional components (e.g. using bipolar junction transistor(s) or field effect transistor(s) such as metal oxide semiconductor field-effect transistor(s)) or as an integrated circuit or chip set organized and operatively coupled as shown. The degree of integration/discreteness of the light engine componentry can vary from one embodiment to the next and the claimed invention is not intended to be so limited. While microcontrollers are depicted, any suitable programmable or otherwise configurable processing environment capable of determining voltage and/or current and providing control signals (such as the Modulated Set-point signal and the Modulation Control signal) can be used. The switch S can be, for example a single pole single throw switch or a transistor (e.g., FET where gate receives the Modulation Control signal).

The modulation element M can be implemented with any element that can be switched into the serial LED string so as to cause a relatively small change in voltage drop across that string, for purposes of modulating voltage drop across that LED string thereby allowing for messaging over the power lines. FIG. 1d shows some example modulation elements that can be used. The range of the voltage drop across the modulation element can vary depending on the type of element and implementation technology. For example, the voltage drop across a diode (D) is approximately 0.7 V for a silicon diode, 0.3 V for a germanium diode, and 0.2 V for a Schottky diode. If the modulation element M is implemented with an LED (which may be part of the LED string, or a separate LED), the voltage drop may be in the range of 1.0 to 5.0 V, depending on the LED color. In case of an LED as a modulation element, note that the light generated by the modulation element can be used in the application and hence the energy consumed by the modulation element provides a supplemental benefit. As will be further appreciated, an even wider range of voltage drops can be realized by utilizing a Zener diode (Z) as the modulation element. As will be further appreciated, a voltage drop can be realized by utilizing a resistor (R) as the modulation element. In a more general sense, any device or circuitry having an active junction associated with a voltage drop can be used as the modulation element M, such as a transistor, so long as the associated voltage drop can be switched in and out to provide a modulated line voltage. In some such embodiments, the modulation element has a pronounced voltage source characteristic, such that the communication quality (achievable signal to noise ratio and cross-talk between the communication from the driver to the light engine and from the light engine to the driver in case of a bi-directional communication scheme utilizing full-duplex operation) improves as $$\left.\frac{dI}{dV}\right|_{V_{Nom}}$$

increases. In some example cases, for instance, $$\left.\frac{dI}{dV}\right|_{V_{Nom}} \geq 1.5 \frac{I_{Nom}}{V_{Nom}}$$

is realized, while in still other embodiments, $$\left.\frac{dI}{dV}\right|_{V_{Nom}} \geq 2.5 \frac{I_{Nom}}{V_{Nom}}$$

can be targeted for further improved communication quality. If the modulation element M is implemented with a resistor, the voltage drop will depend on the value of the effective voltage divider formed by the LED string and the resistor, as will be appreciated.

In one specific example embodiment, the microcontroller B, switch S and modulation element M can be implemented as a chip, such as with an application specific integrated circuit (ASIC) or other purpose-built semiconductor, so as to provide a communication module (generally designated Com Module in the figures). The Com Module could also include other functionalities/componentry as well, like a temperature sensor (e.g., NTC element), light sensor (e.g., photo diode for detecting natural ambient light level), motion sensor, security sensor, and/or other sensors.

Figure 1E:
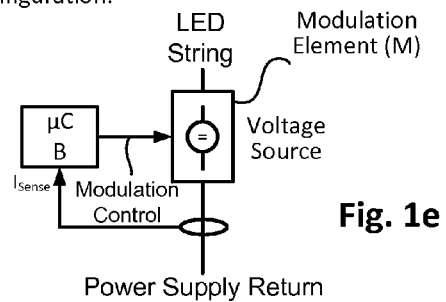
FIG. 1e illustrates an alternate communication module configuration that can be used by the system of FIG. 1a and employs an adjustable voltage source for the modulation element, in accordance with an embodiment of the present invention.

FIG. 1e illustrates an alternate communication module configuration that can be used by the system of FIG. 1a, in accordance with an embodiment of the present invention. As can be seen, this embodiment employs an adjustable voltage source for the modulation element M. There are numerous ways to implement an adjustable voltage sources suitable for this example application, including dissipative and non-dissipative implementations like linear regulators and voltage sources based on switch-mode power supply technology. Note that the Modulation Control signal can be either a digital or an analog signal. In the case of an analog signal, the microcontroller B can be equipped, for example, with a digital-to-analog converter (DAC) and a pin featuring the output of the DAC could be directly connected to the voltage source, in accordance with an embodiment. In the case of a digital signal, a digital output of the microcontroller B is PWM modulated and an external low-pass filter can be used to convert this digital signal into an analog signal. This signal is then used as the set value to the voltage source.

Figure 1F:
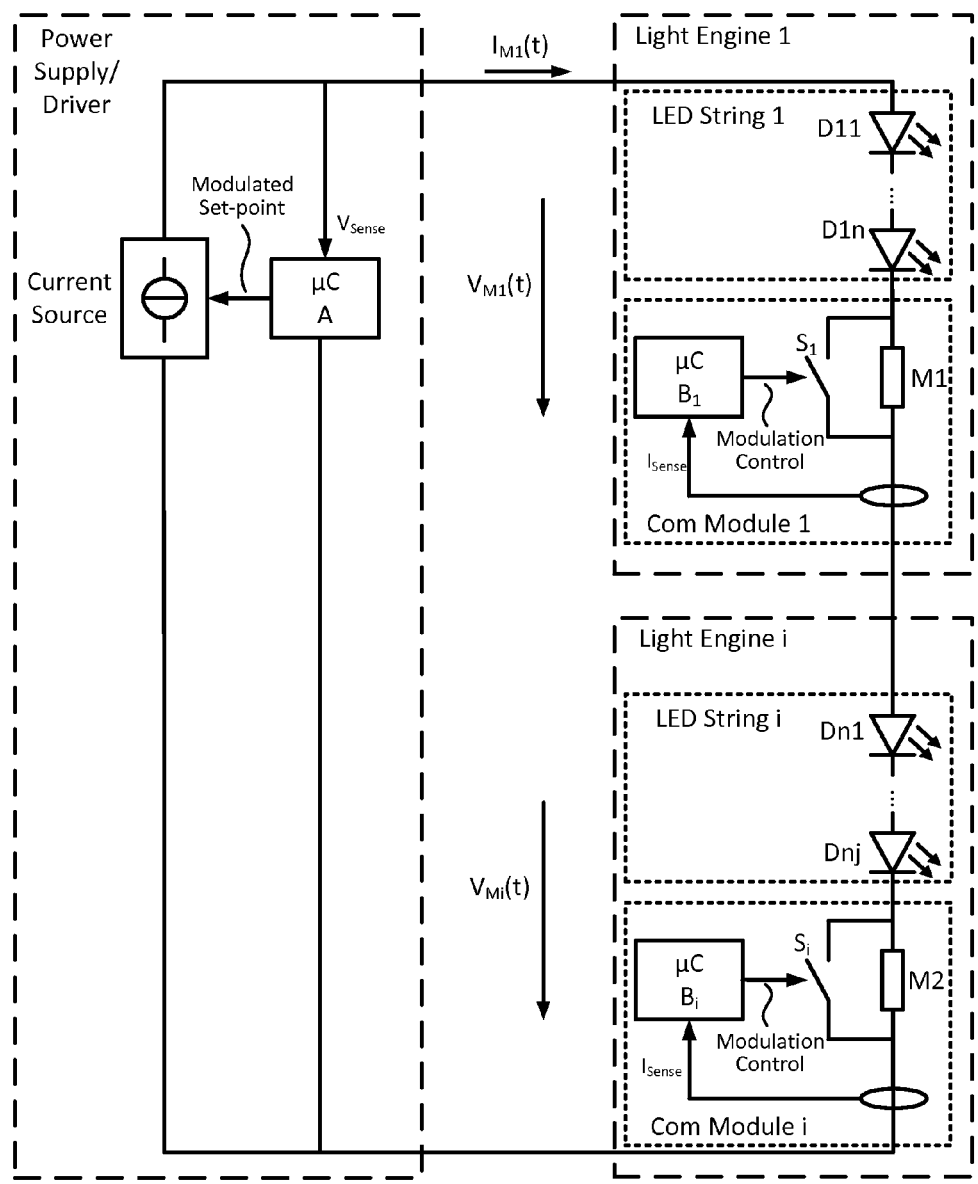
FIG. 1f schematically illustrates a lighting system configured for bi-directional power line communication in accordance with another embodiment of the present invention.
Figure 1A:
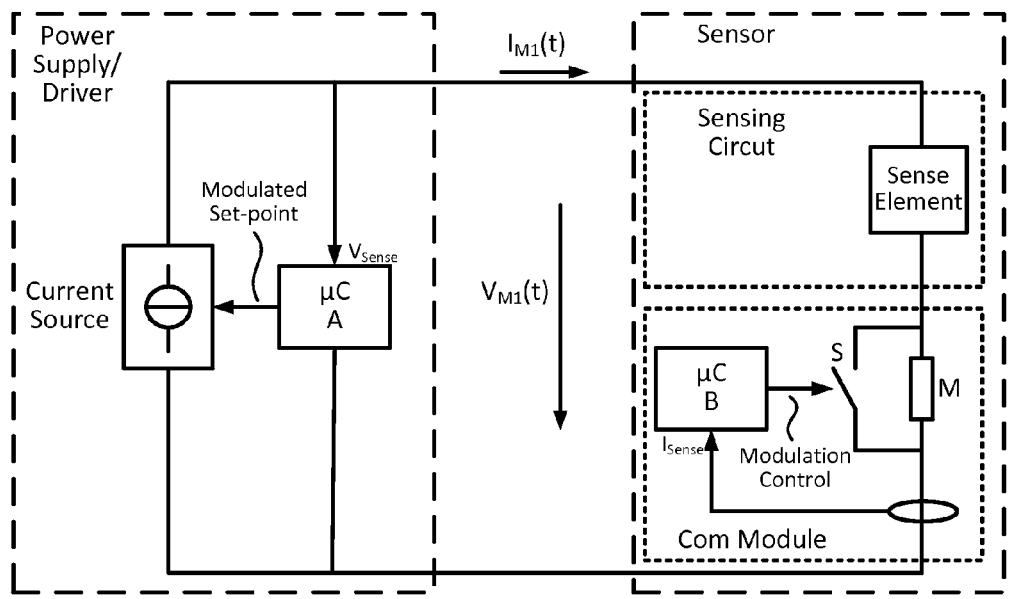
Figure 1E:
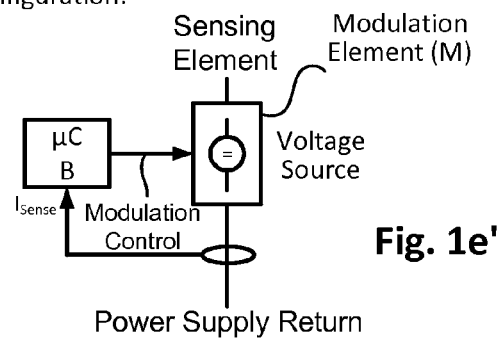

FIG. 1f schematically illustrates a lighting system configured for bi-directional power line communication in accordance with another embodiment of the present invention. As can be seen in this example case, the driver may communicate with multiple light engines 1 through i, where i may be any integer number greater than 1 and assuming the driver can source enough current to properly drive the i LED strings. The driver and light engines can be configured as previously described with reference to FIG. 1a, and that relevant discussion is equally applicable here.

LED string 1 includes LEDs D11 through D1n, and LED string i includes LEDs Dn1 through Dnj. Note that the each LED string may include a different amount of LEDs, or different color LEDs, or otherwise be configured differently. As such, further note that the voltage drop across each LED string 1 through i ($V_{M1}(t)$ through $V_{Mi}(t)$, respectively) may be different or the same, depending on the respective LED string configurations. Each light engine also includes an arrangement to modulate the line voltage as previously described. So, for instance, the microcontroller $B_1$ is operatively coupled to the LED string 1 to sense ($I_{Sense}$) or otherwise measure the current $I_{M1}(t)$ flowing through the LED string 1. In addition, the microcontroller $B_1$ is programmed or otherwise configured to open and close switch $S_1$ via the Modulation Control signal, thereby switching the modulation element $M_1$ in and out of the circuit so as to cause a corresponding change in the voltage drop across the light engine. In a similar fashion, the microcontroller $B_i$ is operatively coupled to the LED string i to sense ($I_{Sense}$) the current $I_{M1}(t)$ flowing through the LED string i, and is configured to open and close switch $S_i$ via the corresponding Modulation Control signal, thereby switching the modulation element $M_i$ in and out of the circuit so as to cause a corresponding change in the voltage drop across the light engine. As previously explained, switches $S_1$ through $S_i$ can be normally turned on, so as to not cause additional power dissipation across the corresponding modulation element $M_1$ through $M_i$ when not communicating.

FIG. 1a' is identical in structure and function to the example embodiment shown in FIG. 1a, except that the light engine has been replaced with a sensor. As can be seen, the sensor includes a Com Module as previously described operatively coupled to a sense element of a sensing circuit. The sensing circuit may be configured to sense any number of parameters, such as a motion sensor, security sensor, temperature sensor (e.g., NTC element), light sensor (e.g., photo diode for detecting natural ambient light level), and/or other sensors to sense things like human-occupancy or environmental issues (e.g., too hot or cold, smoke, etc). FIG. 1e' illustrates an alternate communication module configuration that can be used by the system of FIG. 1a' and employs an adjustable voltage source for the modulation element, in accordance with an embodiment of the present invention. Other than the change of the LED string to a sensing circuit, the previous relevant discussion equally applies here.

Figure 1G:
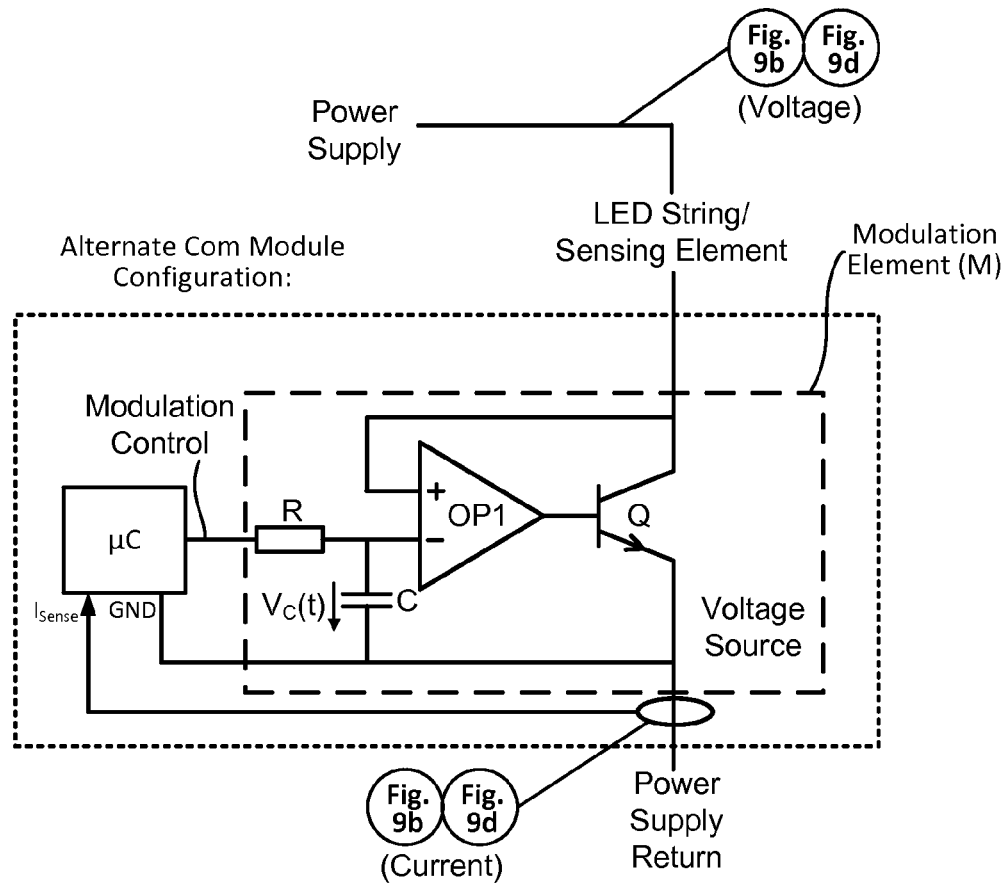
FIG. 1g illustrates an example adjustable voltage source that can be used for the modulation element of the communication module in the systems of FIGS. 1e and 1e', in accordance with an embodiment of the present invention.

As also previously explained, FIGS. 1e and 1e' each shows an example case where an adjustable voltage source is used for the switchable modulation element. To this end, FIG. 1g illustrates an example adjustable voltage source that can be used for the modulation element of the communication module in systems like the one in FIGS. 1e and 1e', in accordance with an embodiment of the present invention. In this example case, it is assumed that the microcontroller of the light engine provides a binary Modulation Control signal to the voltage source. In operation, the microcontroller is programmed or otherwise configured to generate a digital PWM output signal with a duty cycle corresponding to the desired voltage drop across the adjustable voltage source. A low-pass filter configured with resistor R and capacitor C transforms this digital signal into an analog voltage $V_C$ (with negligible ripple) that is used as the set voltage. As can be further seen, the operational amplifier OP1 of this example embodiment is implementing a closed-loop control using this set voltage to control the transistor Q in such a fashion that the voltage drop across transistor Q is constant.

As will be appreciated in light of this disclosure, a switchable modulation element such as shown in FIGS. 1a, 1a', and 1f can be used to provide a binary communication signal, meaning a signal that transitions between two levels (high and low). However, other embodiments may provide communication signals that include more than two levels and/or ramps, such as shown in FIGS. 9b and 9d both of which exhibit changes of V/I over time that generally cannot be accomplished using a single switch arrangement. For instance, in the example case of FIG. 9d, the communication signal has three levels and hence two or more switches could be used to make such a tri-level communication signal. Alternatively, and as shown in FIGS. 1e, 1e', and 1g, an adjustable voltage source can be used to provide such communication signals (like the signals shown in FIGS. 9b and 9d). Just as previously explained, the microcontroller and adjustable voltage source (modulation element M) can be implemented as an integrated circuit, and the previous discussions with respect to the Com Module and varying degrees of integration/discreteness with respect to the overall light engine circuitry is equally applicable here.

In the various embodiments shown herein, it may be desirable to communicate the initial LED current at power-up (before the light is 'on'). Likewise, it may be desirable to communicate the initial sensor current at power-up (or the initial current of any other light system component). In such cases, the driver can be configured to initially drive the light engines (or other component) with low current that allows for communication as described herein, but without overdriving the LEDs (or other component). Once information has been exchanged that will allow the driver to set an appropriate current, the current $I_{M1}(t)$ can be increased based on that information.

Figure 2A:
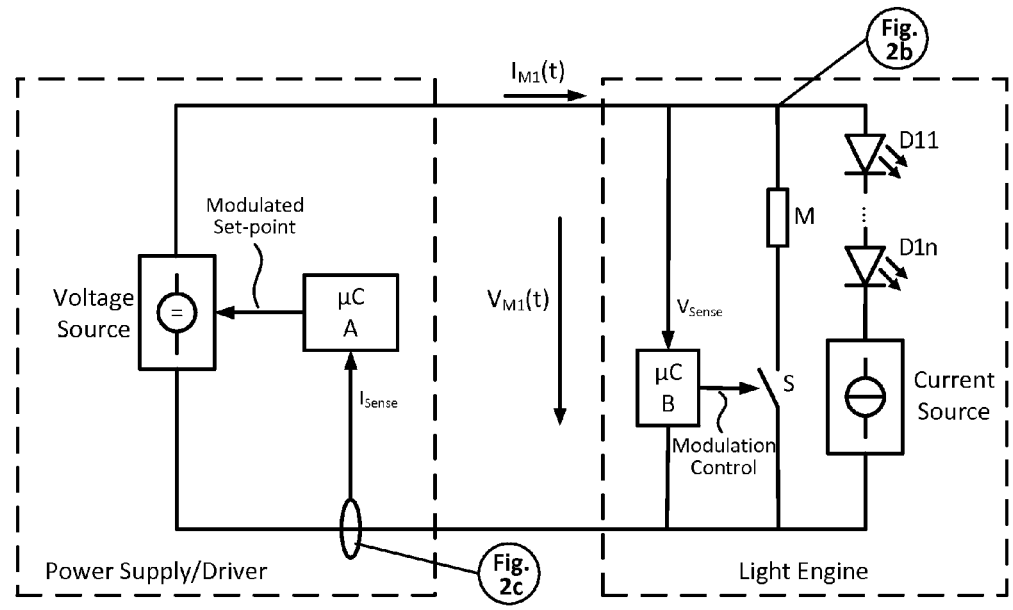
FIGS. 2a and 2a' each schematically illustrates a lighting system configured for bi-directional power line communication in accordance with another embodiment of the present invention.

FIG. 2a schematically illustrates a lighting system configured for bi-directional power line communication in accordance with another embodiment of the present invention. This embodiment allows even for a simultaneous bi-directional communication in both directions sometimes also referred to as full-duplex mode of communication. As can be seen in this example configuration, the system generally includes a power supply or driver and one or more light engines. The driver includes a constant voltage source and a microcontroller A (µC A), and the light engine includes an LED string (D11-D1n), a constant current source, a microcontroller B (µC B), a switch S, and a modulation element M. Other components typical of a driver and light engine are not shown, but will also be apparent. Note that there is no issue with current balancing between individual light engines arranged in a parallel fashion because each light engine will generally have current limiting implemented for operation on constant voltage anyhow, as will be appreciated.

In operation, and just as with the example systems shown in FIGS. 1a-g, the system generally uses current and voltage provided by driver for bi-directional communication, wherein the driver modulates the DC output voltage (to send messages) and measures total current delivered (to receive messages), and the light engine modulates its current (to send messages) and measures voltage (to receive messages). In more detail and with further reference to FIG. 2a, the microcontroller A of the driver is operatively coupled to the power line via an input port of microcontroller A so that it can sense ($I_{Sense}$) or otherwise measure the current $I_{M1}(t)$ flowing from the driver. As can be further seen in FIG. 2a, the microcontroller A includes an output port operatively coupled to the voltage source and is programmed or otherwise configured to adjust the set-point of the voltage source via the Modulated Set-point signal provided at that output port.

On the light engine side of the system, the microcontroller B is operatively coupled across the power lines via two input ports of microcontroller B so that it can sense ($V_{Sense}$) or otherwise measure the voltage drop $V_{M1}(t)$ across the light engine. As can be further seen, the microcontroller B includes an output port operatively coupled to the switch S and is programmed or otherwise configured to open and close that switch via the Modulation Control signal provided at that output port of microcontroller B, thereby switching the modulation element M in and out of the circuit so as to cause a corresponding change in the total current flow through the light engine (and to effectively modulate current flow through the modulation element M). Note that the switch S can be normally turned off so that the modulation element M is normally out-of-circuit for efficiency reasons (to reduce power dissipation), in accordance with an embodiment. The constant current source keeps the LED string current $I_{M1}(t)$ constant regardless of the line voltage $V_{M1}(t)$ or LED string voltage. In some such embodiments, the modulation element M has a pronounced current source characteristic, such that the communication quality (achievable signal to noise ratio and cross-talk between the communication from the driver to the light engine and from the light engine to the driver in case of a bi-directional communication scheme utilizing full-duplex operation) improves as $$\left.\frac{dI}{dV}\right|_{V_{Nom}}$$

decreases. In some example cases, for instance, $$\left.\frac{dI}{dV}\right|_{V_{Nom}} \leq \frac{2}{3}\frac{I_{Nom}}{V_{Nom}}$$

is realized, while in still other embodiments, $$\left.\frac{dI}{dV}\right|_{V_{Nom}} \leq \frac{2}{5}\frac{I_{Nom}}{V_{Nom}}$$

can be targeted for further improved communication quality.

Figure 2B:
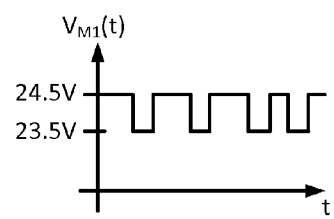
FIG. 2b-c each illustrates a power line communication signal that can be provided by the system of FIG. 2a or 2a', in accordance with an embodiment of the present invention.
Figure 2C:
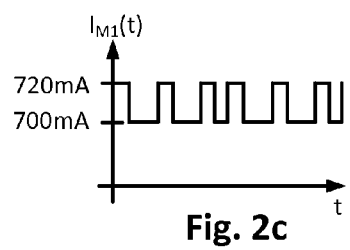

Thus, by modulating the set-point value provided to the voltage source of the driver, the microcontroller A can modulate the output voltage $V_{M1}(t)$ of the driver, so as to provide a communication signal to the light engine. One example such communication signal is shown in FIG. 2b, and is generally designated on FIG. 2a. In addition, by modulating the in-circuit presence of the modulation element M in the light engine, the microcontroller B can modulate the output current $I_{M1}(t)$ of the driver, so as to provide a communication signal to the driver. One example such communication signal is shown in FIG. 2c, and is generally designated on FIG. 2a.

The voltage source, microcontrollers A and B, LEDs D11-D1n, current source, modulation element M, and switch S can be implemented, for example, with discrete conventional components or as an integrated circuit or chip set organized and operatively coupled as shown. The degree of integration/discreteness can vary from one embodiment to the next. While microcontrollers are depicted, any suitable programmable or otherwise configurable processing environment capable of determining voltage and/or current and providing control signals (such as the Modulated Set-point signal and the Modulation Control signal) can be used. The switch S can be, for example a single pole single throw switch or a transistor (e.g., FET where gate receives the Modulation Control signal).

The modulation element M can be implemented with any element that can be switched in parallel to the serial LED string so as to cause a relatively small change in total current flowing through the light engine, for purposes of modulating current flow through the light engine thereby allowing for messaging over the power lines. As previously discussed, FIG. 1d shows some example modulation elements M that can be used. As will be appreciated, the amount of current that flows through the modulation element M when switch S is closed can vary depending on the resistance of the particular element. In one example embodiment, the modulation element M is implemented with a resistor having a value that draws a current in the range of 5 mA to 50 mA (e.g., ~20 mA), although other elements having a suitable resistance or otherwise drawing a desired amount of current can be used. For instance, in another embodiment, the modulation element M is realized by a constant current regulator, a current regulator diode or a current limiting diode having a current range of, for example, 5 mA to 50 mA (e.g., ~20 mA). Just as previously explained, the microcontroller B, switch S and modulation element M can be implemented as an integrated circuit, and the previous discussions with respect to the Com Module and varying degrees of integration/discreteness with respect to the overall light engine circuitry is equally applicable here.

Figure 2D:
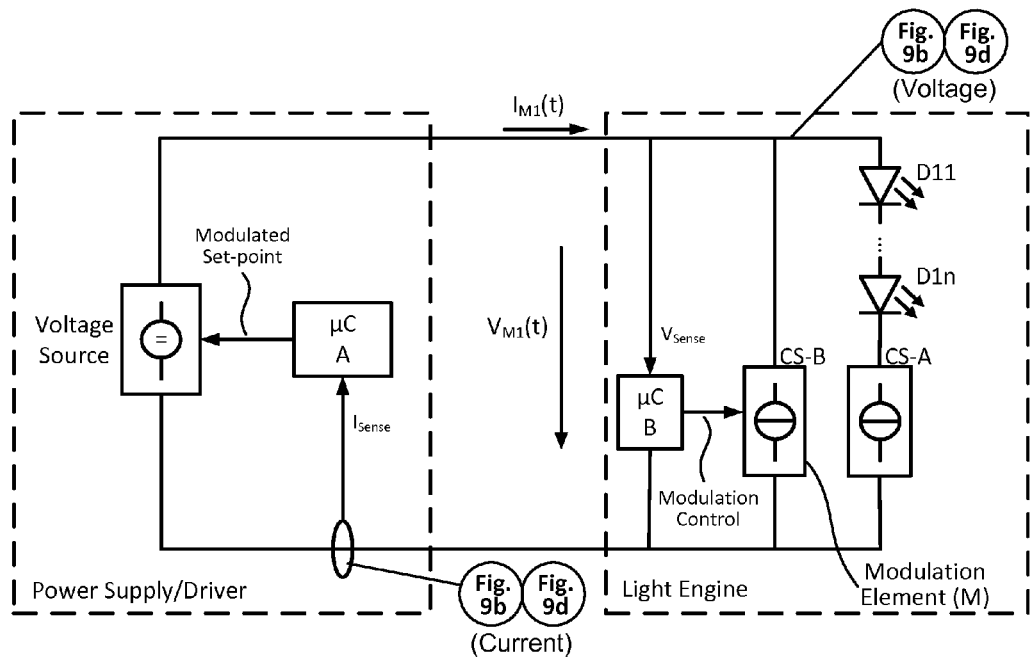
FIGS. 2d and 2d' each schematically illustrates a lighting system configured for bi-directional power line communication in accordance with another embodiment of the present invention.
Figure 2E:
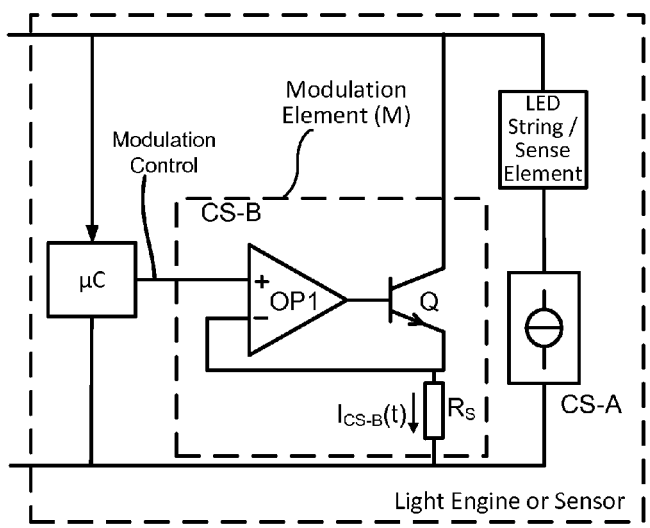
FIG. 2e illustrates an example adjustable current source that can be used for the modulation element of the communication module in the system of FIG. 2d or 2d', in accordance with an embodiment of the present invention.
Figure 2A:
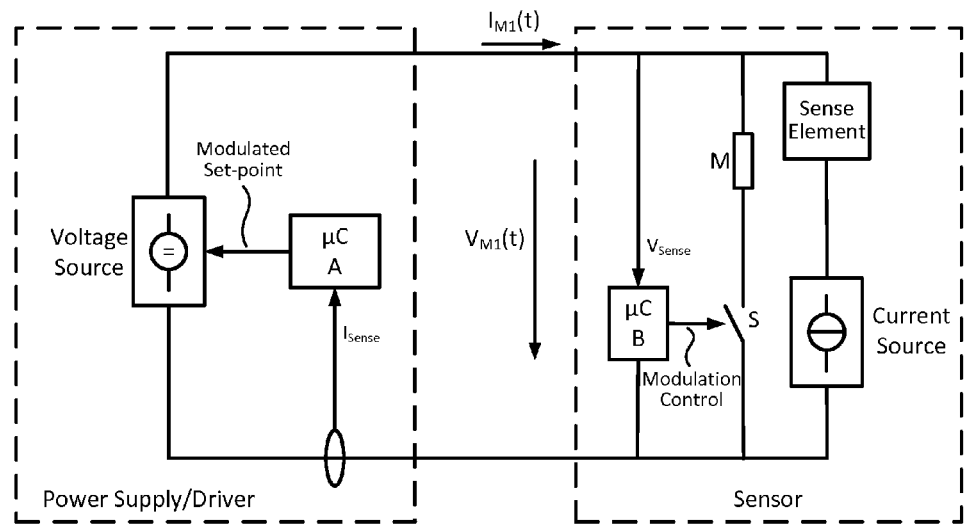
Figure 2D:
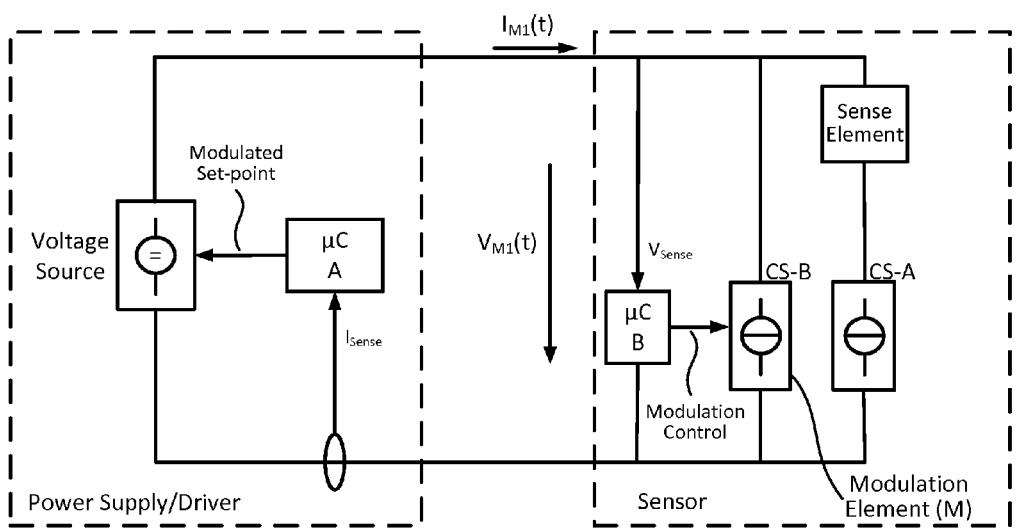

FIG. 2d schematically illustrates a lighting system configured for bi-directional power line communication in accordance with another embodiment of the present invention. As can be seen, this embodiment is similar to the embodiment shown in FIG. 2a, except that it employs an adjustable current source (CS-B) for the modulation element M and there is no switch S. As previously explained, recall that the Modulation Control signal can be either a digital or an analog signal. So, in the case of an analog signal, the microcontroller B can be equipped, for example, with a digital-to-analog converter (DAC) and a pin featuring the output of the DAC could be directly connected to the current source CS-B, in accordance with an embodiment. In the case of a digital signal, a digital output of the microcontroller B is PWM modulated and an external low-pass filter can be used to convert this digital signal into an analog signal. This signal can then be used as the set value to the current source CS-B. FIG. 2e illustrates an example adjustable current source that can be used for the modulation element of the communication module, in accordance with an embodiment of the present invention. In this example case, it is assumed that the microcontroller B of the light engine provides an analog Modulation Control signal (a voltage that defines the set point) to the current source CS-B. The operational amplifier OP1 is implementing a closed-loop control to control the transistor Q in such a fashion that the current ($I_{CS-B}$) through the sense resistor $R_S$ equals the set value given by the microcontroller B.

FIG. 2a' is identical in structure and function to the example embodiment shown in FIG. 2a, except that the light engine has been replaced with a sensor. As can be seen, the sensor includes a Com Module as previously described operatively coupled to a sense element of a sensing circuit. Likewise, FIG. 2d' is identical in structure and function to the example embodiment shown in FIG. 2d, except that the light engine has been replaced with a sensor. As can be seen, the sensor includes a Com Module as previously described operatively coupled to a sense element of a sensing circuit. The previous discussion with respect to suitable sensing circuits is equally applicable here. As previously discussed, FIG. 2e illustrates an alternate communication module configuration that can be used by the system of FIG. 2d', in accordance with another embodiment. Other than the change of the LED string to a sensing circuit, the previous relevant discussion equally applies here.

Figure 2F:
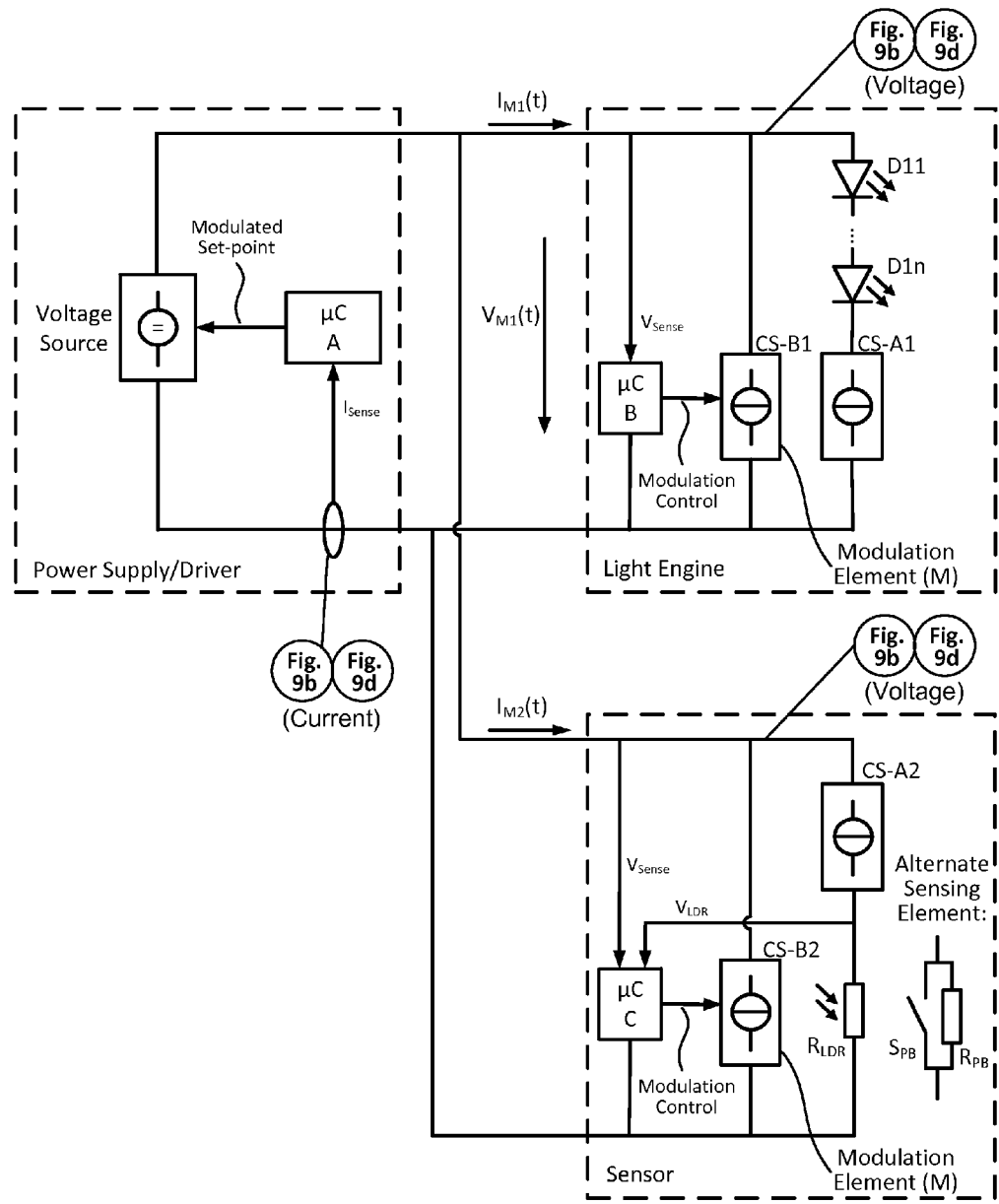
FIG. 2f schematically illustrates a lighting system configured for bi-directional power line communication in accordance with another embodiment of the present invention.

FIG. 2f schematically illustrates a lighting system configured for bi-directional power line communication in accordance with another embodiment of the present invention. As can be seen, the system is effectively a variation on the example embodiments shown in FIGS. 2d and 2d'. The light engine is configured like the light engine in FIG. 2d (note the designation for the current sources is now CS-A1 and CS-B1), and is connected in parallel with a sensor. $V_{M1}(t)$ is across both the light engine and the sensor, with the lighting engine drawing a current of $I_{M1}(t)$ and the sensor drawing a current of $I_{M2}(t)$. The sensor includes current source CS-A2 serially-connected to a sensing element $R_{LDR}$, and a microcontroller C configured to sense voltage $V_{LDR}$ across (and/or current through) the sensing element $R_{LDR}$, and to provide the Modulation Control signal to current source CS-B2, which is connected in parallel to the sensing element $R_{LDR}$. So, current through the sensing element $R_{LDR}$ can be monitored and modulated to provide a communication signal on the power lines. The sensing element $R_{LDR}$ in this example case is an ambient light sensor so-called daylight sensor. As an alternative to the light sensor or light dependent resistor (LDR), a push button switch $S_{PB}$ could be used for user input. Alternatively, the push-button $S_{PB}$ could be connected in parallel with the sensing element $R_{LDR}$ so as to allow use of one current source (only CS-A2 would be included). In such example cases, the sensor microcontroller C would still be able to distinguish sensing element $R_{LDR}$ input from push-button $S_{PB}$ input, because the lowest resistance of the sensing element $R_{LDR}$ is relatively higher than that of the push-button $S_{PB}$. An additional resistor $R_{PB}$ in parallel to the push-button $S_{PB}$ (i.e., push-button in parallel with resistor $R_{PB}$ instead of sensing element $R_{LDR}$) may also be advantageous, because the sensor module will consume the same amount of current regardless of the button being pushed or not. Other embodiments that will be apparent in light of this disclosure include, for instance, an occupancy detector or a touch-panel as sensing/input and output devices (those would not be feed though a current source). In addition, a motor for blinds control could also be part of the system (e.g., see FIG. 6c). As further shown in FIG. 2f, the system can provide communication signals that include more than two levels and/or ramps, such as shown in FIGS. 9b and 9d.

Figure 2G:
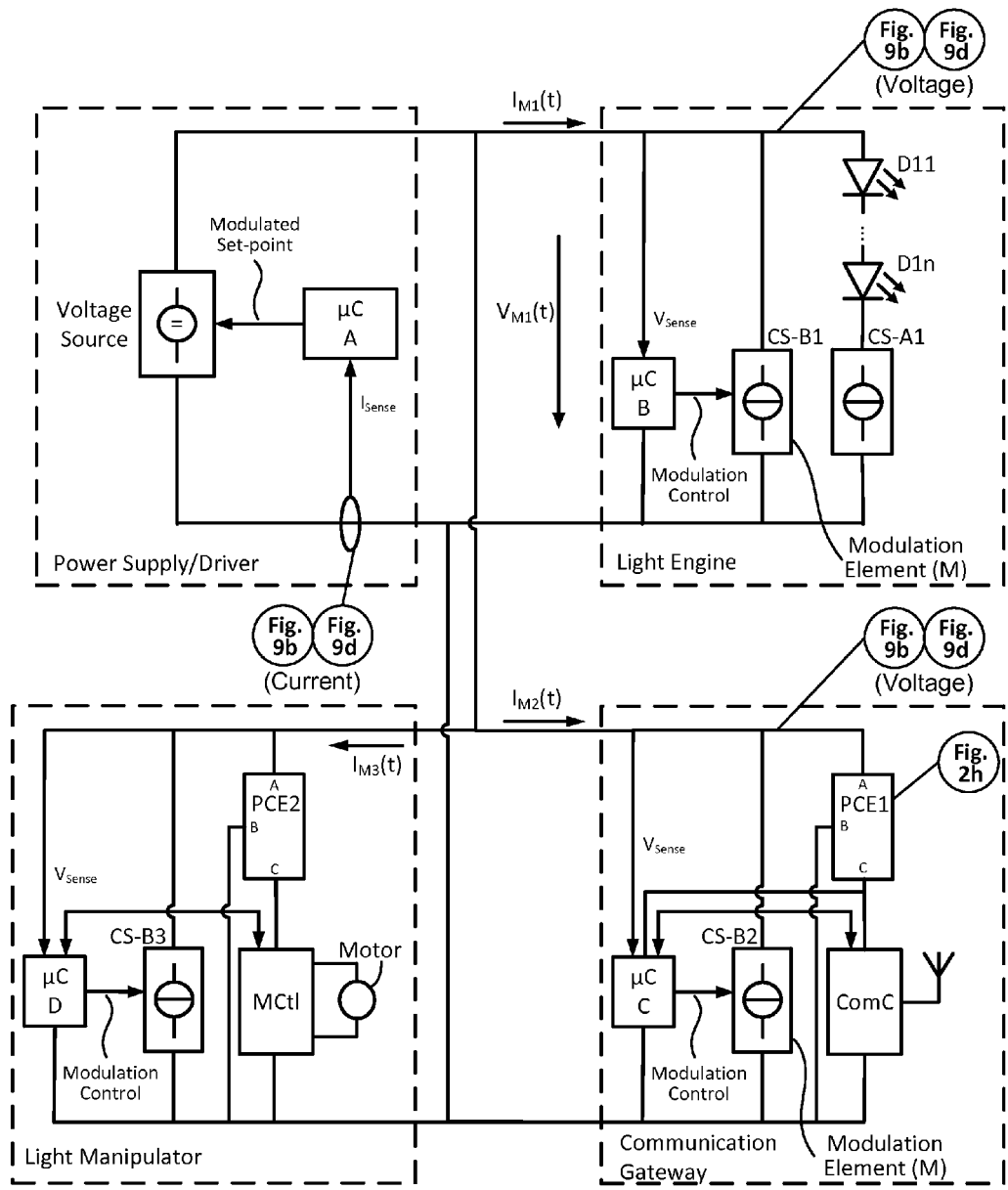
FIG. 2g schematically illustrates a lighting system configured for bi-directional power line communication in accordance with another embodiment of the present invention.

FIG. 2g schematically illustrates a lighting system configured for bi-directional power line communication in accordance with another embodiment of the present invention. As can be seen, the system includes a driver operatively coupled to a light engine in a similar fashion as discussed with reference to FIGS. 2d, 2d', and 2f. In addition, a light manipulator device as well as a communication gateway are connected in a parallel fashion to the light engine and across the DC power lines. $V_{M1}(t)$ is across each of the light engine, the light manipulator device, and the communication gateway, with the lighting engine drawing a current of $I_{M1}(t)$, the communication gateway drawing a current of $I_{M2}(t)$, and the light manipulator device drawing a current of $I_{M3}(t)$.

The communication gateway is generally configured to provide wireless communication capability so as to allow for control of other lighting devices and/or to communicate with an overall lighting or building automation control system. As will be appreciated, this communication gateway serves as a gateway between the power line communication according to an embodiment of the present invention and other methods of communication, e.g. a wireless communication. In other embodiments, the communication gateway may serve as a gateway between a wired communications like DALI or DMX and power line communication as variously provided herein. With further reference to FIG. 2g, the communication gateway includes a microcontroller C configured to provide a Modulation Control signal to current source CS-B2 (for modulating current $I_{M2}(t)$ to send messages to other devices/modules on the system. Microcontroller C can also sense the amount of voltage drop $V_{M1}(t)$ across the communication gateway, for receiving messages from the driver or other DC line voltage modulating devices of the system. In addition, the communication gateway includes a wireless communication circuit (ComC), which can be used to wirelessly communication with other devices/modules of the system via a wireless communication link. The light manipulator device includes a microcontroller D configured to provide a Modulation Control signal to current source CS-B3 (for modulating current $I_{M3}(t)$ to send messages to other devices/modules on the system. Microcontroller D can also sense the amount of voltage drop $V_{M1}(t)$ across the light manipulator device, for receiving messages from the driver or other DC line voltage modulating devices of the system. In addition, the light manipulator device includes a motor module (including motor controller MCtl and motor), which can be used to control a venetian blind other electronic shade, for example.

Further note that in the communication gateway, a bi-directional communication (indicated by double arrow) is present between the resident microcontroller C and the wireless communication circuit ComC. Likewise, a bi-directional communication is present between the resident microcontroller D and the motor controller MCtl. As will be appreciated, such a bidirectional communication path may be realized by a bus between the microcontrollers and the respective elements. So, with respect to the communication gateway, for example, information from a lighting control system or building management controller can be transferred from the communication circuit ComC to the microcontroller C. With respect to the light manipulator circuit, for example, the motor control element (MCtl) can give the microcontroller D information about the motor position by an encoder on the motor shaft or over current shutdown because of the motor being jammed, etc.

Each of the light manipulator circuit and the communication gateway will most likely draw a non-constant current. Thus, in order to prevent inducing noise on the power line (and hence potentially jamming the communication from any device/module, a power conditioning element (PCE) is placed between the respective element and the DC power line, as further shown in FIG. 2g. The PCE may also supply the microcontroller with power, as is the case for PCE1 of the communication gateway. A PCE can generally be designed to power a non-constant load from the power line. At the same time, it can be designed to isolate the non-constant load from the power line (in order to prevent jamming of communications). Thus, and in accordance with one embodiment, each of PCE1 and PCE2 is configured with energy storage elements arranged in a filter configuration, and is further configured with an active circuit regulating its output (terminals A & C; further note that terminal B provides a ground or neutral/return, as the case may be). As further shown in FIG. 2g, the system can provide communication signals that include more than two levels and/or ramps, such as shown in FIGS. 9b and 9d.

Figure 2H:
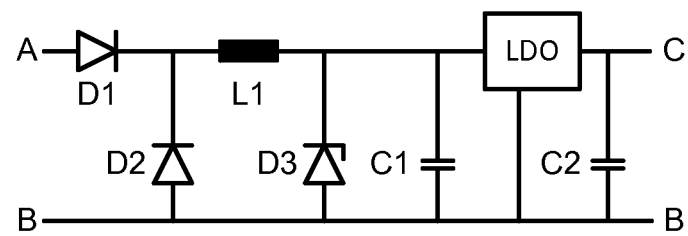
FIG. 2h schematically illustrates an example of a power conditioning element (PCE) configured in accordance with an embodiment.

FIG. 2h schematically illustrates an example of a PCE that could be used to implement PCE1 and PCE2 in case of a system having a constant voltage power supply, such that the PCE is connected in parallel to the output of the driver/power supply (terminals A and B), and provides a constant voltage at its output to the load (terminals C and B) thereby shielding any modulation on the DC power line from the load, in accordance with an embodiment. Further note that the PCE can be designed to consume constant current from the power supply and has a filter, which in this example case includes inductor L1 and capacitor C1. Capacitor C1 is a bulk capacitor that can store significant amount of energy. In particular, if the voltage on the DC power line is PWM modulated the energy storage in C1 might be quite large (capacitor with several hundred microfarads depending on the load current). The LDO is a low voltage drop regulator (alternatively, a switch-mode power supply may be used) that provides constant voltage at its output C. Diode D3 is optional and provides overvoltage protection for the LDO in case of hot plugging of the module. Diode D1 prevents current from flowing back into the power line and allows energy storage in C1 over long periods of time, and diode D2 provides a path for L1 (in case the bus gets actively pulled low by the driver for PWM modulation) or prevents or otherwise inhibits high voltage or even arcs when unplugging the module in operation (so-called hot un-plugging).

Figure 3A:
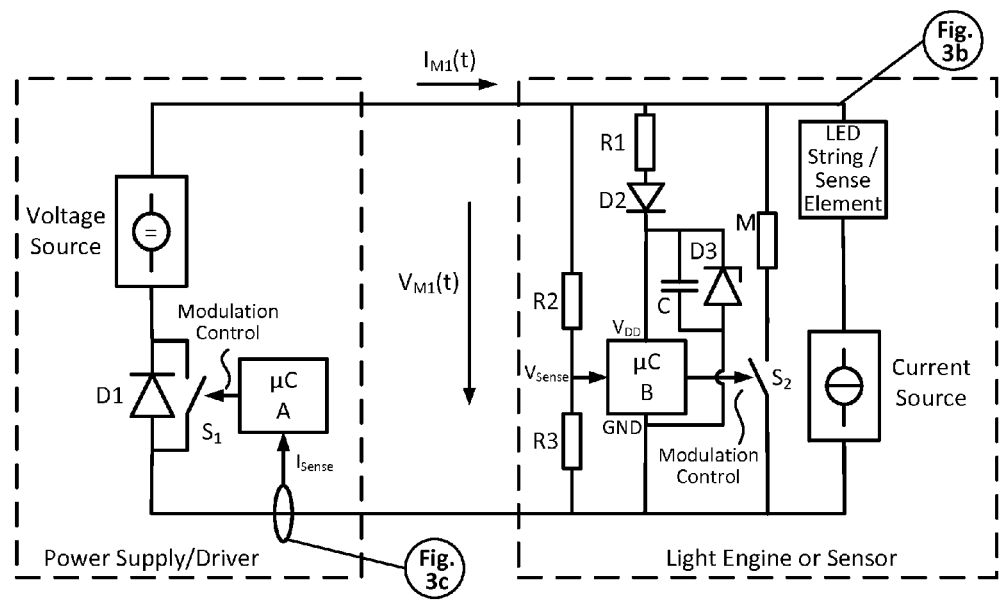
FIG. 3a schematically illustrates a lighting system configured for bi-directional power line communication in accordance with another embodiment of the present invention.

FIG. 3a schematically illustrates a lighting system configured for full-duplex power line communication in accordance with another embodiment of the present invention. As can be seen, this example lighting system allows for bi-directional power line communication that is full-duplex (meaning simultaneous bi-directional) power line communication, even though the system can also be used in half-duplex mode. In half-duplex mode at any point in time the flow of information is only from one transmitting device to one or more receiving devices. As will be appreciated, the principle of operation of this example embodiment is similar to that of the embodiment shown in FIGS. 2a, 2a', 2d, 2d', and 2f such that the driver modulates the DC output voltage (to send messages) and measures total current delivered (to receive messages), and the light engine or sensor or other lighting system component modulates its current (to send messages) and measures voltage (to receive messages). To this end, the previous relevant description is equally applicable here. However, as can be further seen in this example configuration, the modulation circuitry is implemented in a different manner.

In more detail, microcontroller A of the driver is still configured to sense ($I_{Sense}$) the current $I_{M1}(t)$ flowing from the driver, but rather than modulating or otherwise controlling the set-point of the voltage source, microcontroller A is programmed or otherwise configured to switch a modulation element (in this case, diode D1) in and out of the circuit by providing the Modulated Set-point signal to switch $S_1$. So, when $S_1$ is closed, the modulation element D1 is by-passed and no voltage drop across that element is provided, and when $S_1$ is open, the modulation element D1 is in-circuit and provides a voltage drop (e.g., 0.2 to 1.4V, depending on the type of diode).

On the light engine (or sensor or other lighting system component, as the case may be—for purposes of this discussion light engine is used) of the system, the microcontroller B is operatively coupled with a resistive divider including resistors R1 and R2 that provide $V_{Sense}$ to an input port of microcontroller B, thereby allowing the line voltage $V_{M1}(t)$ across the light engine to be determined. Also, additional circuitry including resistor R1, diode D2, Zener D3, and capacitor C are operatively coupled so as to derive the microcontroller B power supply ($V_{DD}$) from the line voltage $V_{M1}(t)$. As will be appreciated, the voltage reference provided by D3 provides a stable $V_{DD}$ to microcontroller B. The capacitor C provides a degree of energy storage, such that if the line voltage is switched off, the energy stored in capacitor C can temporarily provide power to microcontroller B. Instead of a capacitor other energy storage elements can be used such as rechargeable batteries or super-capacitors. Diode D2 prevents reverse current from flowing to the driver. As can be further seen, the microcontroller B includes an output port operatively coupled to the switch $S_2$ and is programmed or otherwise configured to open and close that switch via the Modulation Control signal provided at that output port of microcontroller B, thereby switching the modulation element M in and out of the circuit so as to cause a corresponding change in the total current flow through the light engine, as previously explained. Note that switch $S_1$ can be normally turned on and switch $S_2$ can be normally turned off for efficiency reasons (to reduce power dissipation), in accordance with an embodiment.

Figure 3B:
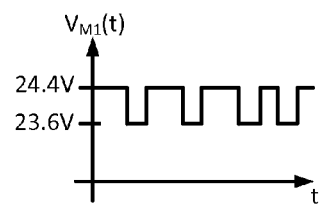
FIG. 3b-c each illustrates a power line communication signal that can be provided by the system of FIG. 3a, in accordance with an embodiment of the present invention.
Figure 3C:
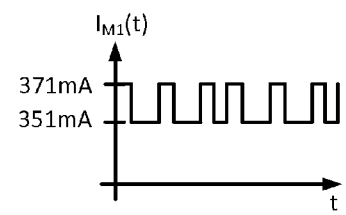

In one example embodiment, assume the driver has a desired nominal voltage of 24V, and the LEDs on the light engine have a desired nominal current of 350 mA. In one such example embodiment, further assume the voltage of the constant voltage source inside the driver is designed to be 24.4V. This will ensure that the actual driver output voltage $V_{M1}(t)$ varies (due to the communication) right around the desired nominal voltage of 24V and thereby minimizes the impact on the operation of any light engine designed for the nominal voltage of 24V. One example such communication signal is shown in FIG. 3b, and is generally designated on FIG. 3a. In a similar fashion, the constant current source of the light engine is designed to sink the nominal amount of current (~350 mA). Further note in this example embodiment that the current drawn by voltage divider R1, R2 and microcontroller B combined was designed to be about 1 mA, and modulation element M was implemented with a resistor selected to draw about 20 mA if switch $S_2$ is closed. Therefore, the current $I_{M1}(t)$ varies approximately between 351 and 371 mA. One example such communication signal is shown in FIG. 3c, and is generally designated on FIG. 3a.

Numerous variations will be apparent in light of this disclosure. For instance, another embodiment may use a resistor instead of diode D1, should the added expense of a diode be undesirable. Note, however, that in such an embodiment, the voltage $V_{M1}(t)$ supplied by the driver may show a stronger dependency on load current $I_{M1}(t)$. Hence, the signal to noise ratio of the communication may also vary with the load current $I_{M1}(t)$. This may not cause an issue, but is worth consideration. In another alternative, a transistor can be used in place of diode D1 and switch $S_1$. In one such case, an additional control loop can be implemented that controls the voltage drop across transistor. For instance, the control scheme may measure the voltage drop across the transistor and adjust the drive signal (e.g., gate voltage or base current) in such a way that the voltage drop equals the set voltage drop. The set voltage drop is either 0 or a predefined value (e.g., 0.5V) depending on the state of the binary signal that is currently being transmitted by the driver. Another variation on the embodiment shown in FIG. 3a is to use an adjustable current source as the modulation element as shown in FIGS. 2d, 2d', and 2e (rather than the using a switchable ($S_2$) modulation element as shown in FIG. 3a).

Figure 4A:
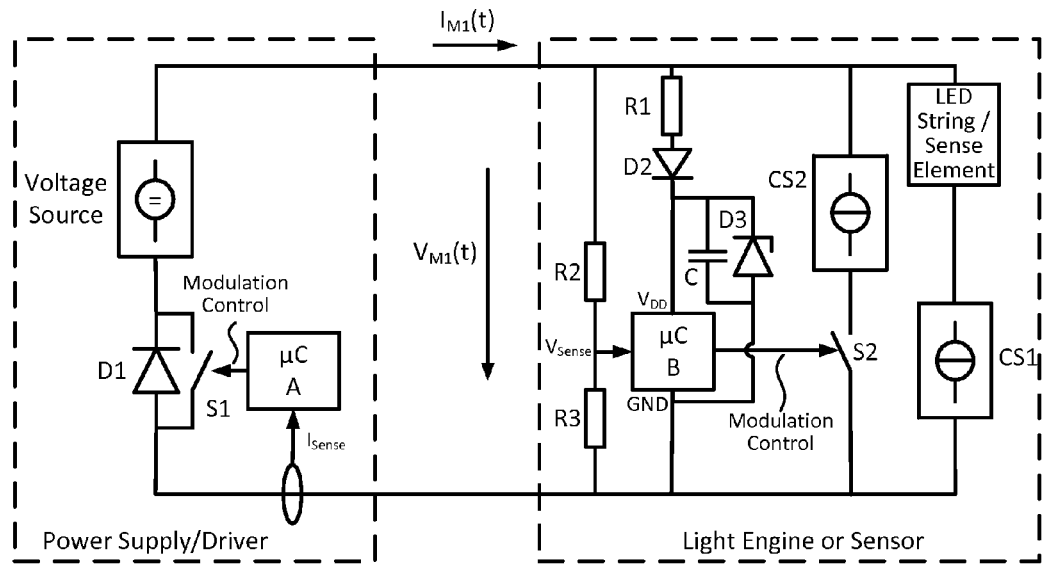
FIG. 4a schematically illustrates a lighting system configured for bi-directional power line communication in accordance with another embodiment of the present invention.
Figure 4B:
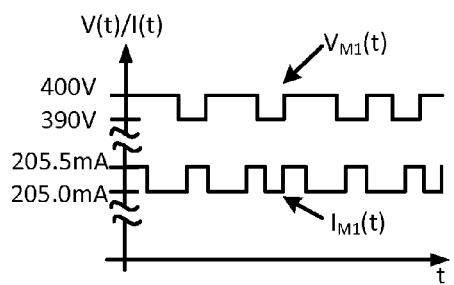
FIG. 4b illustrates power line communication signals that can be provided by the system of FIG. 4a, in accordance with an embodiment of the present invention.

FIG. 4a schematically illustrates a lighting system configured for bi-directional power line communication in accordance with another embodiment of the present invention. This embodiment is similar to the one shown in FIG. 3a, except that the modulation element M is implemented with a switchable ($S_2$) constant current source (CS2). In the embodiment of FIG. 3a, the current flowing through the switch $S_2$ depends on the line voltage which varies while information is communicated from the driver to the light engine (or sensor or other lighting system component, as the case may be—for purposes of this discussion light engine is used). In case the light engine talks during times when the driver talks there will be a cross-talk. In such cases, the driver will sense relatively small changes in current $I_{M1}(t)$ whenever the microcontroller A of the driver activates or deactivates switch $S_1$. Depending on the amplitude of the $V_{M1}(t)$ modulation, this cross-talk may be very small and tolerable. The constant current source CS2 in the embodiment shown in FIG. 4a can be used eliminate this cross-talk. A full-duplex communication with no cross-talk is therefore possible as further illustrated in FIG. 4b, wherein the driver voltage $V_{M1}(t)$ is modulated by the driver between about 390V and 400V, and the driver output current $I_{M1}(t)$ is modulated by the light engine between about 205 mA and 205.5 mA. Numerous other workable modulation schemes and communication signal parameters will be apparent in light of this disclosure.

As will be further appreciated in light of this disclosure, the constant current sources CS1 and CS2 located in the light engine are current sources that sink current, meaning these current sources do not provide energy into the circuit unlike driver-based current sources used in some embodiments (constant current drivers such as the example embodiments shown in FIGS. 1a-g). A variation on the embodiment shown in FIG. 4a is to use an adjustable current source as the modulation element as shown in FIGS. 2d, 2d' and 2e (rather than the using a switchable ($S_2$) modulation element as shown in FIG. 4a).

Figure 5A:
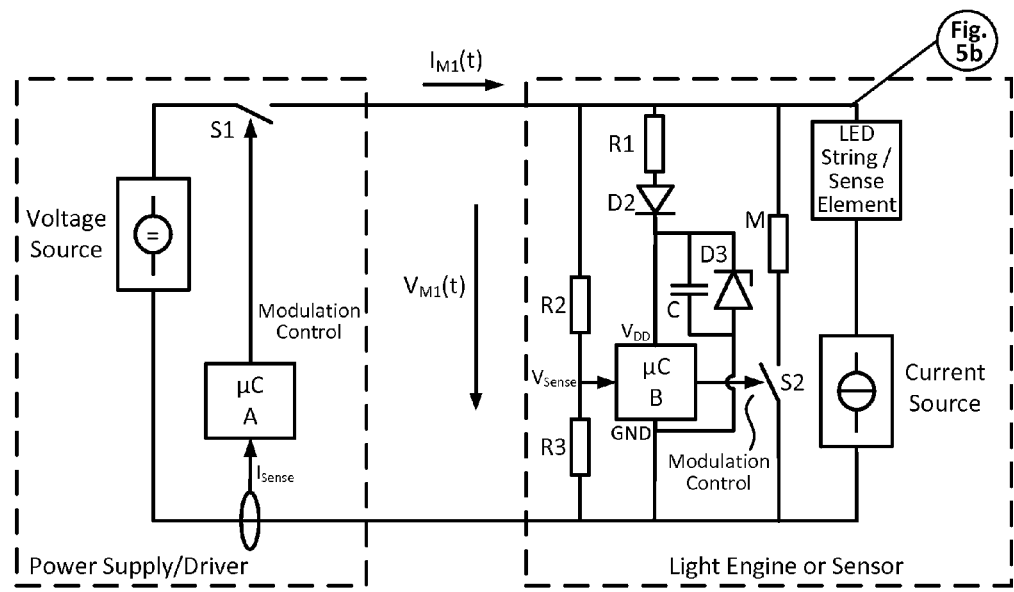
FIG. 5a schematically illustrates a lighting system configured for bi-directional power line communication in accordance with another embodiment of the present invention.

FIG. 5a schematically illustrates a lighting system configured for bi-directional power line communication in accordance with another embodiment of the present invention. This embodiment is similar to the one shown in FIG. 3a, except that the driver can only be switched between an in-circuit state where its output voltage $V_{M1}(t)$ is provided to the light engine and an out-of-circuit state where no voltage is provided to the light engine. In particular, rather than switching in diode D1 (or a resistor or other modulation element), microcontroller A is configured to close switch $S_1$ to provide output voltage $V_{M1}(t)$ to the light engine, and to open switch $S_1$ to remove the output voltage $V_{M1}(t)$ from the light engine. Note that is some driver designs, the switch $S_1$ is provided to control the LED brightness by controlling the pulse width, so no new switch is needed in such driver designs.

In this embodiment, the light engine can only talk when the switch $S_1$ is closed. In one example scenario of the communication, the light engine synchronizes to the pulse with frequency of the driver and changes the current consumed only as when there is no line voltage. Thus, switch $S_2$ is only activated or deactivated when there is no line voltage applied due to switch $S_1$ being open. An advantage of this modulation scheme is that it is very robust and allows communication even at very low duty cycles (very dim light), as compared to say, for example, an amplitude modulation scheme where the current amplitude may change during a pulse of the driver.

Figure 5B:
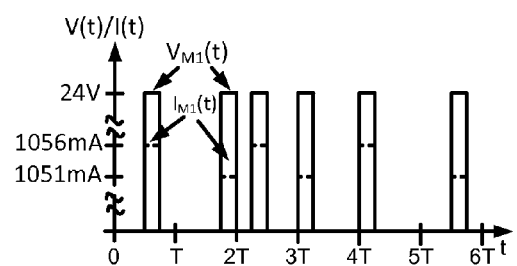
FIG. 5b illustrates power line communication signals that can be provided by the system of FIG. 5a, in accordance with an embodiment of the present invention.

FIG. 5b illustrates power line communication signals that can be provided by the system of FIG. 5a, in accordance with an embodiment of the present invention. As can be seen, the driver modulates its output voltage $V_{M1}(t)$ between 24V and 0V, and the light engine modulates the driver output current $I_{M1}(t)$ between 1051 mA and 1056 mA. Note that the microcontroller B is powered ($V_{DD}$) even when the switch $S_1$ is open, because during that period of time (e.g., 50 uSec to 20 mSec), capacitor C is discharging to keep $V_{DD}$ at an acceptable level until switch $S_1$ is closed again thereby allowing capacitor C to charge up to $V_{DD}$ again. A variation on the embodiment shown in FIG. 5a is to use an adjustable current source as the modulation element as shown in FIGS. 2d, 2d', and 2e, rather than the using a switchable ($S_2$) modulation element as shown in FIG. 5a.

Again, while specific reference is made to a light engine communicating with a driver in FIGS. 3a-c, 4a-b, and 5a-b, other similar embodiments may include other communicating lighting system components, such as a sensor communicating to a driver, controller, or light management system. Numerous bidirectional communications will be apparent in light of this disclosure.

Master-Slave Communication Protocol

Figure 6A:
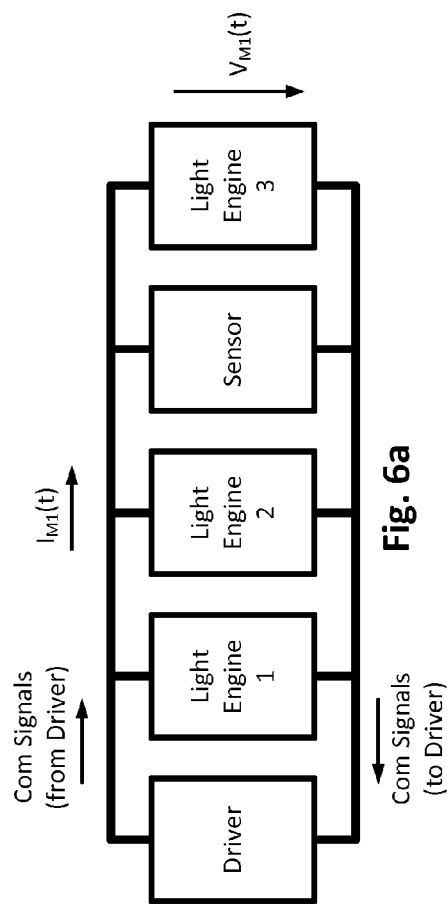
FIGS. 6a-c each illustrates a block diagram of a lighting system configured for bi-directional power line communication in accordance with an embodiment of the present invention.

FIG. 6a illustrates a block diagram of a lighting system configured for bi-directional power line communication in accordance with an embodiment of the present invention. As can be seen, the system includes a driver operatively coupled to three parallel light engines and a sensor, and the power lines operatively coupled between the driver, light engines 1 through 3, and sensor provide both power and a communication path as variously described herein. This example embodiment could be, for instance, in a luminaire or an installation of an entire room or area.

The driver may be a constant current or constant voltage driver, and the light engines 1 through 3 may be implemented with any of the configurations shown in or otherwise discussed herein. Numerous variations will be apparent in light of this disclosure. The sensor can be any sensor device or circuit, like a temperature sensor (e.g., NTC element), light sensor (e.g., photo diode for detecting ambient and/or natural light level), motion sensor, security sensor, and/or other sensors, as previously explained. As will be further appreciated, the sensor may be configured with its own Com Module (such as shown in FIG. 1a') or may rely on the Com Module of one of the light engines 1 through 3.

In general, any lighting system component with suitable processing capability can be a master device, in accordance with some embodiments. In one example such case, a given driver may act as the master device and may therefore indicate which of the various available slave components to which it is coupled is currently allowed to talk. To this send, the communication signals generated by the master/driver can be generated according to any number of suitable communication protocols. For multi-device systems like the one shown in FIGS. 6a-c, the communication protocol may include, for example, a data frame having an ID code, a payload portion, and an end bit. So, in one example scenario, assume the driver issues a message to light engine 3 by modulating the power line voltage or current to indicate the following message: 01101010, wherein the first three bits from the left (011) represent the ID code for light engine 3, the next 4 bits (0101) represent the payload of the message, and the last bit (0) represents the stop bit. With reference to FIG. 1b, for example, a logical '0' would be the 35V level and a logical '1' would be the 38V level. The 4-bit payload of the message may include any number of commands/instructions such as the following shown in Table 1.

TABLE 1

Example Driver/Master Commands

| 4-Bit Payload | Command/Instruction |
|---|---|
| 0001 | Target device can talk until released |
| 0010 | Report any Error codes |
| 0011 | Report Sensor Data |
| 0100 | Set color to White |
| 0101 | Set color to Blue |
| 0110 | Set color to mix of blue-white |
| 0111 | Set color to mix of mint-amber |
| 1000 | Set brightness to 25% |
| 1001 | Set brightness to 50% |
| 1010 | Set brightness to 75% |
| 1011 | Set brightnessto 100% |
| 1100 | Set brightness to 0% |
| 1101 | Sound alarm |
| 1110 | Activate Camera |
| 1111 | Target device is released (no talking) |

Once one of the slave devices is given permission to talk, that device may communicate back to the driver (or with some other device, as the case may be). So, continuing with the example protocol of Table 1, assume the light engine 3 is responding to a query from the driver by modulating the power line voltage or current to indicate the following message: 00011100, wherein the first three bits from the left (000) represent the ID code for the driver, the next 4 bits (1110) represent the payload of the message, and the last bit (0) represents the stop bit. With reference to FIG. 1c, for example, a logical '0' would be the 700 mA level and a logical '1' would be the 720 mA level. The 4-bit payload of the Slave message may include any number of responses such as the following shown in Table 2.

TABLE 2

Example Slave Device Response

| 4-Bit Payload | Response |
|---|---|
| 0001 | Error code 1 |
| 0010 | Error code 2 |
| 0011 | Error code 3 |
| 0100 | Color set to White |
| 0101 | Color set to Blue |
| 0110 | Color set to mix of blue-white |
| 0111 | Color set to mix of mint-amber |
| 1000 | Brightness set to 25% |
| 1001 | Brightness set to 50% |
| 1010 | Brightness set to 75% |
| 1011 | Brightness set to 100% |
| 1100 | Brightness set to 0% |
| 1101 | Alarm triggered |
| 1110 | Camera activated |
| 1111 | Target device has nothing to say |

There are several advantages of having this additional communication capability. For example, it allows for sharing the information provided by a sensor with the entire lighting system. So, for example, sensor information is not limited to the driver to which it is connected. In addition, more complex and enhanced lighting controls may be provisioned. For instance, a given light engine can set its own drive current. In addition, CCT dimming and color tuning can be readily implemented. Also, individually addressable light engines can be deployed on the same driver channel, wherein communications with respect to on-off switching, dimming, color control, etc, can be executed on the power line communication medium. Likewise, that same communication medium can be used to power and communicate with sensors. The techniques provided herein also allow for the integration of lighting in an overall building automation system.

Figure 6B:
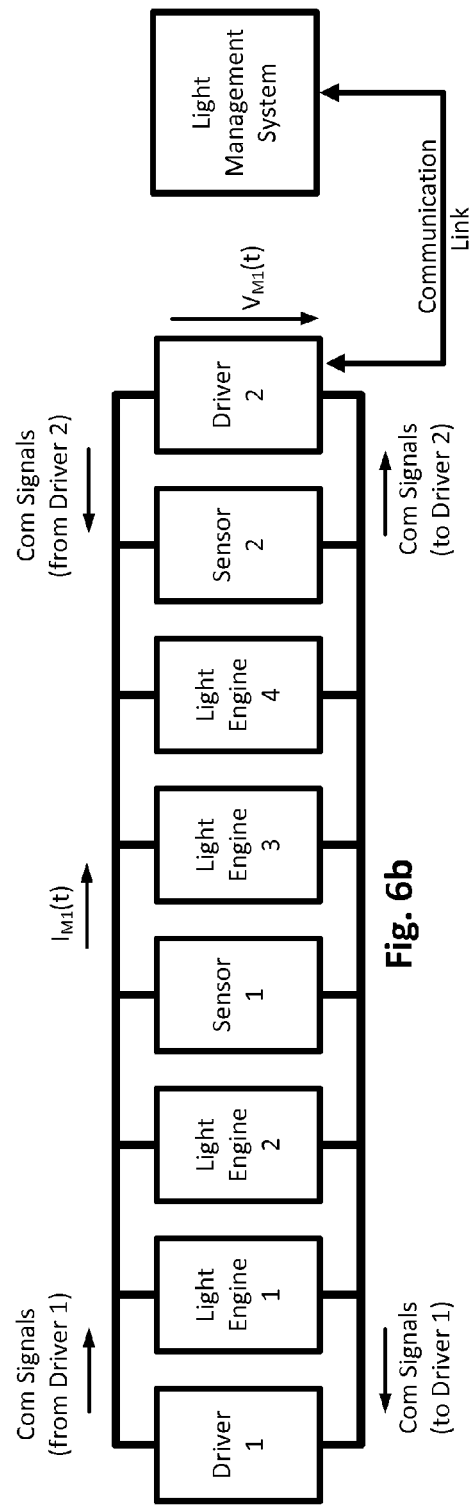
Figure 6C:
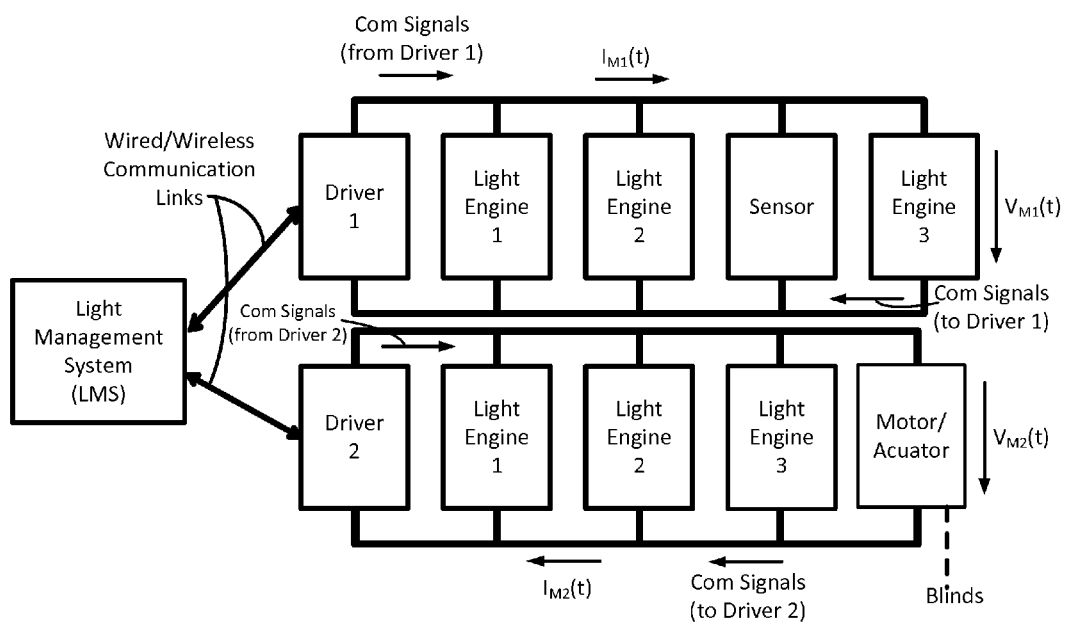

Note that a given driver can communicate with any number of sensors, other drivers, a room controller, or an overall light management system (LMS), or even a motor or actuator as variously shown in FIGS. 6b and 6c. The actuator in the embodiment of FIG. 6c can be used, for instance, to raise and lower blinds (e.g., for privacy purposes after closing time, or to inhibit transfer of heat during the hot portion of the daytime so as to reduce need for air conditioning) in a given installation in accordance with an established LMS or building management plan. The communication path to the LMS can be, for example, a wired communication like DALI, DMX, or a power line communication, and/or a wireless communication. Wireless communication links may also be used between any other devices of the system, to supplement the power line communications as variously described herein, in some embodiments. If drivers are paralleled (such as drivers 1 and 2 in FIG. 6b), only one driver needs to be connected to the LMS and the other driver can be a slave to that LMS-coupled driver, in order to provide various advantageous discussed herein (e.g., Driver 2 can communicate with Driver 1). On the other hand, drivers that are merely coupled to the same LMS can remain independent masters, such as shown in FIG. 6c.

As will be further appreciated, the size of the data frame can be increased to accommodate a greater number of ID codes (e.g., 3-bit ID code accommodates up to 7 different devices; 4-bit ID code accommodates up to 15 devices, etc), a more complex instruction/response set, error codes, and other typical communication protocol features. Also, note that the master-slave arrangement can be implemented in a number of ways. While the examples illustrated in Tables 1 and 2 only allow a master device to give and take away communication permission, another embodiment may allow the master device to give communication permission but the slave device keeps that permission until the slave devices releases control back to the master device, so as to allow for a more asynchronous request/response exchange. Moreover, any number of encoding/decoding techniques can be used in conjunction with a given communication protocol to delineate multiple simultaneous communications (messages) from the power line communication medium, as is known in the field of communications. In a more general sense, the power line communication techniques disclosed herein can be used in conjunction with any suitable conventional and/or proprietary communication protocol and encoding/decoding techniques, as will be appreciated in light of this disclosure.

Figure 7:
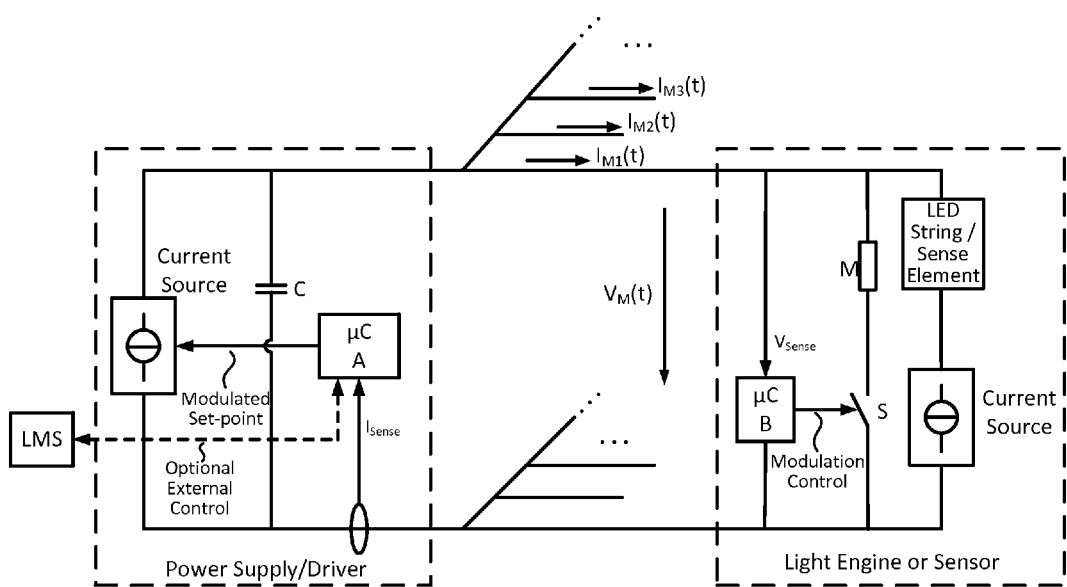
FIG. 7 schematically illustrates a lighting system configured for bi-directional power line communication in accordance with another embodiment of the present invention.

FIG. 7 schematically illustrates a lighting system configured for bi-directional power line communication in accordance with another embodiment of the present invention. As can be seen, this example embodiment includes a single driver operatively coupled to a plurality of light engines and/or sensors connected in parallel (or other lighting system components). The driver of this example is configured as a constant current driver with low-dynamic response, wherein the driver modulates its DC output voltage by setting different set-values for the output current, e.g. converter's duty cycle, and measures (total) current delivered, as previously explained. Also, note that in this example case, the microcontroller A of the driver is operatively coupled with an LMS that is capable of providing monitor and control functions. In general, any type of communication can be passed between the LMS and microcontroller A. In addition, each light engine modulates its respective current ($I_{M1}(t)$, $I_{M2}(t)$, $I_{M3}(t)$, ...) and measures voltage $V_M(t)$ as previously explained. Note that the driver is generally too slow to counter act the current modulations provided by the light engines. To this end, low-dynamic response generally means that the driver behaves more like a constant voltage source rather than a current source for short time intervals. This is true for most constant current drivers, and particularly so for lower cost implementations such as drivers that have an output capacitor of substantial size in order to keep the ripple current through the LEDs low. One such example output capacitor is generally designated as capacitor C of the driver in the example embodiment of FIG. 7. The capacitor C generally prevents fast dynamic changes in line voltage. A variation on the example embodiment shown in FIG. 7 is to use an adjustable current source as the modulation element as shown in FIGS. 2d, 2d', and 2e, rather than the using a switchable (S) modulation element as shown in FIG. 7.

Figure 8:
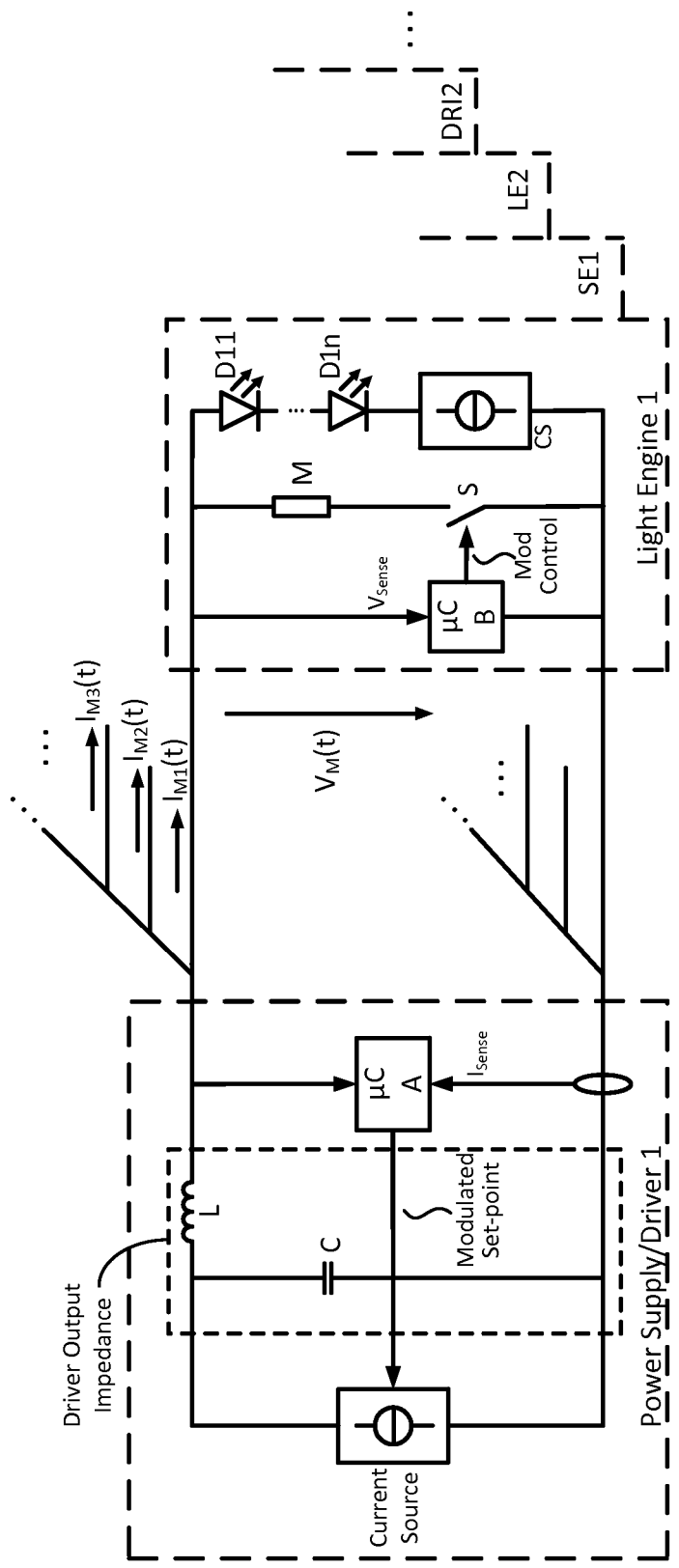
FIG. 8 schematically illustrates a lighting system configured for bi-directional power line communication in accordance with another embodiment of the present invention.

FIG. 8 schematically illustrates a lighting system configured for bi-directional power line communication in accordance with another embodiment of the present invention. As can be seen, this example configuration is similar to that of FIG. 7, except that the driver includes a complex/non-linear output impedance. The output impedance of the driver can be determined or tailored by the passive components (inductor L and capacitor C) and/or control loop dynamics. The principle of operation is as previously explained herein, wherein a given one of the drivers/light engines/sensors modulates its output voltage/current (or impedance, as the case may be). This voltage/current modulation can be detected by other devices connected to the power line, and allows direct and bi-directional communication between all devices. Note that a multi-master arrangement is possible, such as the example case where light engine 1 communicates with light engine 2 (LE2), or where sensor 1 (SE1) communicates with light engine 1, or where driver 2 (DRI2) communicates with light engine 2 (LE2), or where driver 1 communicates with driver 2 (DRI2), etc. As will be appreciated, a variation on the example embodiment shown in FIG. 8 is to use an adjustable current source as the modulation element as variously shown in FIGS. 2d, 2d', and 2e, rather than the using a switchable (S) modulation element as shown in FIG. 8.

Multi-Modulation Scheme for Multiple Dimming Modes

The disclosed power line communication techniques can further be used in the context of multiple dimming modes such as analog and pulse width modulation (PWM) dimming, and without adversely impacting driver efficiency or light engine efficacy. For instance, in case of analog dimming the amplitude of the time-continuous LED current (a DC current with potentially some ripple e.g. 10% peak-to-peak ripple in current) is varied in order to change in this particular case the brightness of the LEDs. In case of PWM dimming the LED current is flowing intermittently depending on the duty cycle. In such cases, the PWM frequency is chosen to be high enough so that the eye of the observer will average over or otherwise not perceive the pulsating luminous flux, and hence the duty cycle determines the perceived brightness. The dimming scheme may similarly influence a motor current instead of the LED current or other lighting system component current, as will be appreciated in light of this disclosure. In more detail, the driver can be programmed or otherwise configured to vary the modulation scheme based on the active dimming mode. So, for instance, the modulation scheme can be changed from frequency modulation to phase shift keying as the driver switches over from analog dimming (the amplitude of the LED current is varied in order to change the brightness) to PWM dimming. In such cases, the light engine (or other lighting system component operatively coupled to the power lines) can be further configured to detect the change in dimming mode and to automatically use a corresponding way of decoding the modulated signals received via the power lines.

For example, when analog dimming is being used, suitable modulation schemes include amplitude modulation, frequency modulation, phase modulation, pulse shape modulation (PSM), slope variation of current/voltage, pattern swapping, frequency shift keying (FSK), and all combinations, such as FSK and pattern swapping (or so-called bit-flipping, wherein the data stream determines odd cycles and the even cycle pattern is the inversion of the previous odd cycle). When PWM modulation is being used, a suitable modulation scheme includes pulse event modulation, wherein the time event (within period) at which a pulse with constant width occurs changes depending on data.

Note, however, that regardless of which modulation scheme is being used, the average power provided to the LEDs, sensor, actuator, wireless router, or other lighting system component is constant regardless of whether or not there is currently communication going on. Further note that there is no need for the various communicating lighting system components to communicate the active modulation scheme in advance of its deployment as is the case in typical communication systems. This is because, in the context of a lighting system, a given lighting device (e.g., power supply, light engine, sensor, actuator, wireless/wired communication module, etc) can be configured to independently and quickly determine the currently active dimming mode by using, for example, a local microcontroller configured to measure parameters indicative of a dimming mode (e.g., pulse widths, voltage levels, etc). Thus, once a change in dimming mode is detected, the microcontroller can be further programmed or otherwise configured to change the modulation scheme accordingly. In some such cases, for instance, the microcontroller may include a look-up table or other memory structure that indexes a plurality of available modulation schemes by dimming mode type. So, the detected dimming mode can be used to quickly identify the new modulation scheme. Communications from that point on can be transmitted and received according to that new modulation scheme, until there is another change in dimming mode.

Figure 9A:
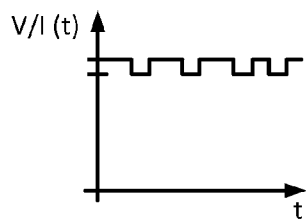
FIGS. 9a-f illustrate example modulation schemes that can be used by a lighting system configured for bi-directional power line communication in accordance with an embodiment of the present invention.
Figure 9B:
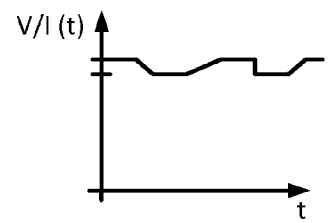
Figure 9C:
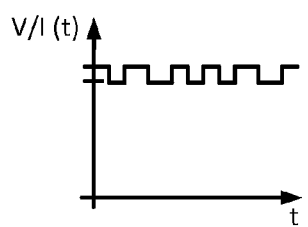
Figure 9D:
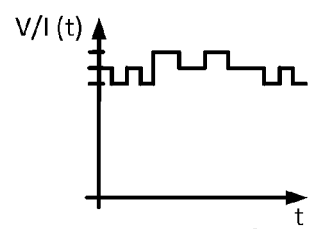
Figure 9E:
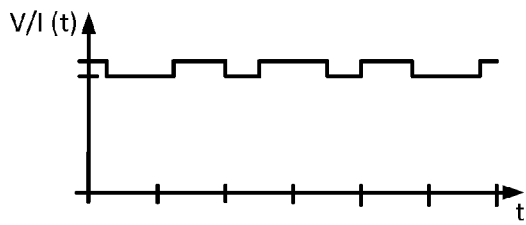
Figure 9F:
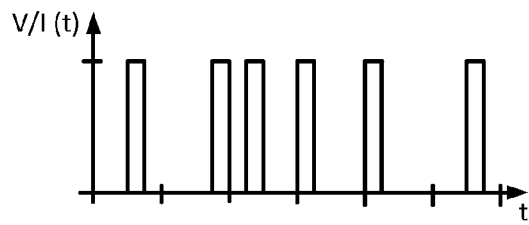

FIGS. 9a-f illustrate example modulation schemes that can be used, depending on the dimming mode. In particular, FIG. 9a shows frequency modulation, FIG. 9b shows slope variation, FIG. 9c shows FSK modulation, FIG. 9d shows amplitude modulation, and FIG. 9e shows pattern swapping, all of which can be used when analog dimming is being used, in accordance with an embodiment. FIG. 9f shows pulse event modulation which can be used with PWM dimming. In one such case, note that the pulse event coding scheme used with PWM dimming ensures that the average pulse width over a time period shorter than the max time period defined by 1/[flicker perception frequency] (e.g., $\frac{1}{80}$ Hz=12.5 ms) is kept constant. The average pulse width determines the brightness of the LEDs and is given by the dimming level requested by the user or LMS. As will appreciated, making the time period shorter than the max time will ensure that there is no visible flicker visible to the occupants or users of the illuminated space.

High-Voltage Interface

Figure 10A:
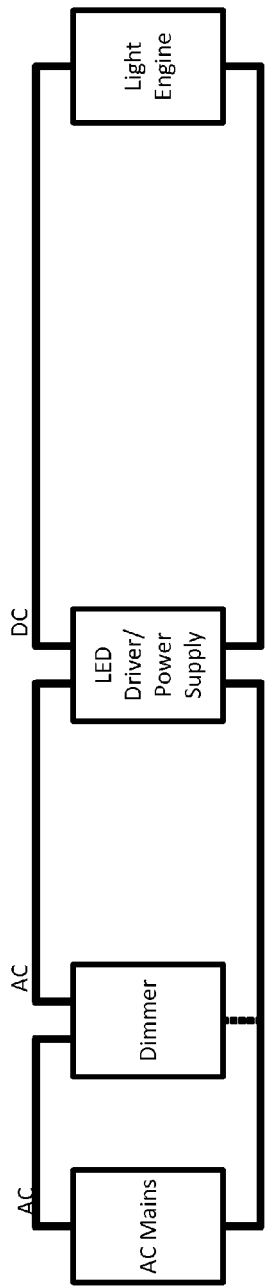
FIGS. 10a-b each illustrates a block diagram of a lighting system configured for bi-directional power line communication in accordance with another embodiment of the present invention.
Figure 10B:
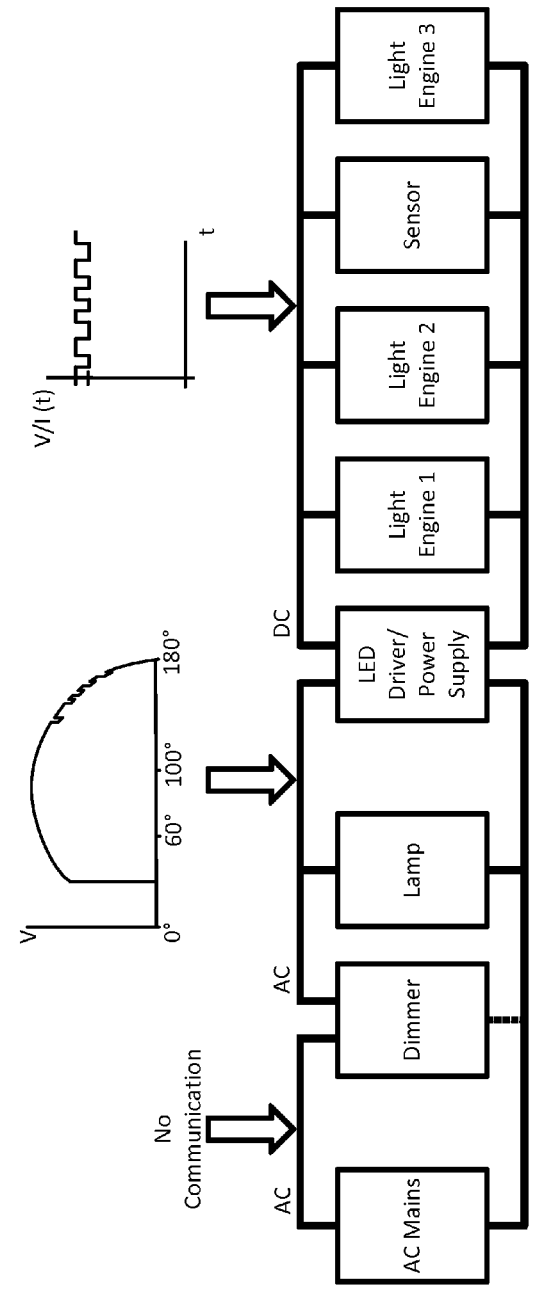

FIGS. 10a-b each illustrates a block diagram of a lighting system configured for bi-directional power line communication in accordance with another embodiment of the present invention. As can be seen, the example system shown in FIG. 10a includes an LED power supply/driver and a light engine, much like the embodiments shown in FIGS. 1a through 8, but further includes an AC mains and dimmer operatively coupled to the input of the LED driver. The line voltage on the input side of the driver is high voltage AC, while the line voltage on the output side of the driver is low voltage DC. FIG. 10b shows a similar embodiment, with the addition of a lamp on the input side of the driver and two more light engines and a sensor on the output side of the driver.

As can be further seen, power line communication can occur on both the high voltage AC side and the low voltage DC side of the LED driver. However, the communication on the AC side is implemented differently and entails a modulation of the AC power signal. In contrast, the communication on the DC side is implemented as described herein, by variously modulating the DC voltage/current within a relatively small window that is imperceptible or otherwise negligible to lighting system performance. An example of each of the communication signal is graphically depicted above the corresponding section of the system. No communication occurs between the AC mains and the dimmer in this example embodiment.

Numerous variations and configurations will be apparent in light of this disclosure. For instance, one example embodiment of the present invention provides a lighting system. The system includes a first light source, a first modulation element operatively coupled to the first light source, and a first processor configured to use the first modulation element to modulate one of current flow through the first modulation element or voltage drop across the first light source, thereby providing a first power line communication signal. In some cases, the system includes a first switch configured to control the in-circuit presence of the first modulation element in response to a first modulation control signal provided by the first processor, so as to modulate the one of current flow through the first modulation element or voltage drop across the first light source, thereby providing the first power line communication signal. In one such case, the first modulation element is electrically connected in series with the first light source and the first switch is electrically connected in parallel to the first modulation element, such that the voltage drop across the first light source is modulated in response to the first modulation control signal. In another such case, the first modulation element is electrically connected in parallel with the first light source and the first switch is electrically connected in series to the first modulation element, such that the current flow through the first modulation element is modulated in response to the first modulation control signal. In some such cases, the system includes a current source that is electrically connected in series with the first light source. In other such cases, the first modulation element comprises a current source. In some cases, the processor is further configured to sense one of the amount of current flow through the first light source or the amount of voltage drop across the first light source so as to allow for receipt and interpretation of an incoming power line communication signal. In some cases, the system includes a first power supply configured to provide power to the first light source via a power line on which the first power line communication signal is transmitted. In some such cases, the first power supply includes a second processor configured to modulate one of current or voltage output by the first power supply, thereby providing a second power line communication signal. In one such case, the second processor is further configured to sense one of the amount of voltage drop across the first light source or a total amount of current flow comprising current flow through the first light source and the first modulation element, so as to allow for receipt and interpretation of the first power line communication signal. In another such case, the first power supply comprises a voltage source, and the system further includes a second modulation element electrically connected in series with the voltage source, and a second switch configured to control the in-circuit presence of the second modulation element in response to a second modulation control signal from the second processor, so as to modulate voltage output by the voltage source, thereby providing the second power line communication signal. In another such case, the first power supply comprises a voltage source, and the system further includes a second switch electrically connected in series with the voltage source and responsive to a second modulation control signal provided by the second processor, such that the voltage output by the voltage source can effectively be turned on and off in response to the second modulation control signal. In some cases, the first processor is powered by a voltage supply derived from a power line upon which the first power line communication signal is transmitted. In some such cases, the system includes a capacitor that provides power to the first processor during time intervals when no power is provided on the power line. In some cases, the system includes at least one of a sensor, a second light source, and/or a second power supply. In some cases, the first modulation element comprises a voltage source serially connected with the first light source and responsive to a first modulation control signal provided by the first processor. In some cases, the first modulation element comprises a current source connected in parallel to the first light source and responsive to a first modulation control signal provided by the first processor.

Another example embodiment of the present invention provides a lighting system. The system includes a first LED string and a first processor configured to provide a first modulation control signal, and to sense one of the amount of current flow through the first LED string or the amount of voltage drop across the first LED string so as to allow for receipt and interpretation of an incoming power line communication signal. The system further includes a first modulation element operatively coupled to the first LED string and configured to cause modulation of one of current flow through the first modulation element or voltage drop across the first LED string in response to the first modulation control signal, thereby providing an outgoing power line communication signal. The system further includes a first power supply connector configured to receive power for the first LED string via a power line on which the incoming and outgoing power line communication signals are transmitted. In some cases, the system includes a first switch configured to control the in-circuit presence of the first modulation element in response to the first modulation control signal, so as to modulate voltage drop across the first LED string, thereby providing the outgoing power line communication signal, wherein the first modulation element is electrically connected in series with the first LED string and the first switch is electrically connected in parallel to the first modulation element. In some cases, the system includes a first switch configured to control the in-circuit presence of the first modulation element in response to the first modulation control signal, so as to modulate current flow through the first modulation element, thereby providing the outgoing power line communication signal, wherein the first modulation element is electrically connected in parallel with the first LED string and the first switch is electrically connected in series to the first modulation element. In one such case, the system includes a current source that is electrically connected in series with the first LED string. In another such case, the first modulation element comprises a current source. In some cases, the system includes a first power supply (operatively coupled to the first power supply connector) and a second processor, the processor configured to modulate one of current or voltage output by the first power supply using a second modulation control signal, thereby providing the incoming power line communication signal. In such cases, the second processor is further configured to sense one of the amount of voltage drop across the first LED string or a total amount of current flow comprising current flow through the first LED string and the first modulation element, so as to allow for receipt and interpretation of the outgoing power line communication signal. In some cases, the first modulation element comprises at least one of: a voltage source that is serially connected with the first LED string and is responsive to the first modulation control signal provided by the first processor; and/or a current source connected in parallel to the first LED string and responsive to the first modulation control signal provided by the first processor.

Another example embodiment of the present invention provides a non-transient computer program product encoded with instructions that when executed by one or more processors cause a power line communication process to be carried out in a light system, the process comprising: providing, via a processor, a modulation control signal for controlling a modulation element operatively coupled to a light source, so as to modulate one of DC current flow through the modulation element or DC voltage drop across the light source, thereby providing an outgoing power line communication signal; and sensing, via the processor, one of the amount of DC current flow through the light source or the amount of DC voltage drop across the light source so as to allow for receipt and interpretation of an incoming power line communication signal.

A computer program product as provided herein can be, for example, one or more computer-readable mediums such as, for instance, a hard drive, compact disk, server, memory stick, or any suitable non-transitory computer/computing device memory that includes or can otherwise be encoded with executable instructions, or a plurality or combination of such memories (e.g., memory provided in a microcontroller or other processing environment). Other embodiments can be implemented, for instance, with gate-level logic or an application-specific integrated circuit (ASIC) or chip set or other such purpose built logic, or a microcontroller having input/output capability (e.g., inputs for receiving user inputs and outputs for directing other components) and a number of embedded routines for carrying out the device functionality. In short, the disclosed techniques can be implemented in hardware, software, firmware, or any combination thereof.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A lighting system, comprising:
a first light source;
a first modulation element operatively coupled to the first light source;
a first processor configured to use the first modulation element to modulate one of current flow through the first modulation element or voltage drop across the first light source, thereby providing a first power line communication signal; and
a first switch configured to control the in-circuit presence of the first modulation element in response to a first modulation control signal provided by the first processor, so as to modulate the one of current flow through the first modulation element or voltage drop across the first light source, thereby providing the first power line communication signal wherein the first modulation element is electrically connected in parallel with the first light source and the first switch is electrically connected in series to the first modulation element, such that the current flow through the first modulation element is modulated in response to the first modulation control signal.

2. The system of claim 1 wherein the processor is further configured to sense one of the amount of current flow through the first light source or the amount of voltage drop across the first light source so as to allow for receipt and interpretation of an incoming power line communication signal.

3. The system of claim 1 further comprising at least one of a sensor, a second light source, and/or a second power supply.

4. The system of claim 1 wherein the first modulation element comprises a voltage source serially connected with the first light source and responsive to a first modulation control signal provided by the first processor.

5. The system of claim 1 wherein the first modulation element comprises a current source connected in parallel to the first light source and responsive to a first modulation control signal provided by the first processor.

6. The system of claim 1 wherein the first modulation element is electrically connected in series with the first light source and the first switch is electrically connected in parallel to the first modulation element, such that the voltage drop across the first light source is modulated in response to the first modulation control signal.

7. The system of claim 6 further comprising a current source that is electrically connected in series with the first light source.

8. The system of claim 6 wherein the first modulation element comprises a current source.

9. The system of claim 1 further comprising a first power supply configured to provide power to the first light source via a power line on which the first power line communication signal is transmitted.

10. The system of claim 9 wherein the first power supply includes a second processor configured to modulate one of current or voltage output by the first power supply, thereby providing a second power line communication signal.

11. The system of claim 10 wherein the second processor is further configured to sense one of the amount of voltage drop across the first light source or a total amount of current flow comprising current flow through the first light source and the first modulation element, so as to allow for receipt and interpretation of the first power line communication signal.

12. The system of claim 10 wherein the first power supply comprises a voltage source, the system further comprising:
a second modulation element electrically connected in series with the voltage source; and
a second switch configured to control the in-circuit presence of the second modulation element in response to a second modulation control signal from the second processor, so as to modulate voltage output by the voltage source, thereby providing the second power line communication signal.

13. The system of claim 10 wherein the first power supply comprises a voltage source, the system further comprising:
a second switch electrically connected in series with the voltage source and responsive to a second modulation control signal provided by the second processor, such that the voltage output by the voltage source can effectively be turned on and off in response to the second modulation control signal.

14. The system of claim 1 wherein the first processor is powered by a voltage supply derived from a power line upon which the first power line communication signal is transmitted.

15. The system of claim 14 further comprising a capacitor that provides power to the first processor during time intervals when no power is provided on the power line.

16. A lighting system, comprising:
a first light source;
a first modulation element operatively coupled to the first light source wherein the first modulation element comprises a current source;
a first processor configured to use the first modulation element to modulate one of current flow through the first modulation element or voltage drop across the first light source, thereby providing a first power line communication signal; and
a first switch configured to control the in-circuit presence of the first modulation element in response to a first modulation control signal provided by the first processor, so as to modulate the one of current flow through the first modulation element or voltage drop across the first light source, thereby providing the first power line communication signal wherein the first modulation element is electrically connected in series with the first light source and the first switch is electrically connected in parallel to the first modulation element, such that the voltage drop across the first light source is modulated in response to the first modulation control signal.

17. A lighting system, comprising:
a first light source;
a first modulation element operatively coupled to the first light source;
a first processor configured to use the first modulation element to modulate one of current flow through the first modulation element or voltage drop across the first light source, thereby providing a first power line communication signal; and a first power supply configured to provide power to the first light source via a power line on which the first power line communication signal is transmitted wherein the first power supply includes a second processor configured to modulate one of current or voltage output by the first power supply, thereby providing a second power line communication signal and the second processor is further configured to sense one of the amount of voltage drop across the first light source or a total amount of current flow comprising current flow through the first light source and the first modulation element, so as to allow for receipt and interpretation of the first power line communication signal.

18. The system of claim 17 wherein the first power supply comprises a voltage source, the system further comprising:

a second modulation element electrically connected in series with the voltage source; and a second switch configured to control the in-circuit presence of the second modulation element in response to a second modulation control signal from the second processor, so as to modulate voltage output by the voltage source, thereby providing the second power line communication signal.

19. The system of claim 17 wherein the first power supply comprises a voltage source, the system further comprising:

a second switch electrically connected in series with the voltage source and responsive to a second modulation control signal provided by the second processor, such that the voltage output by the voltage source can effectively be turned on and off in response to the second modulation control signal.

* * * * *